US008939395B2

(12) United States Patent
Yarger

(10) Patent No.: US 8,939,395 B2
(45) Date of Patent: Jan. 27, 2015

(54) TAIL FAN APPARATUS AND METHOD FOR LOW SPEED YAW CONTROL OF A ROTORCRAFT

(75) Inventor: Cody Brandon Yarger, Salt Lake City, UT (US)

(73) Assignee: Groen Brothers Aviation, Inc., Salt Lake City, UT (US)

( * ) Notice: Subject to any disclaimer, the term of this patent is extended or adjusted under 35 U.S.C. 154(b) by 441 days.

(21) Appl. No.: 13/282,749

(22) Filed: Oct. 27, 2011

(65) Prior Publication Data
US 2012/0104154 A1 May 3, 2012

Related U.S. Application Data

(63) Continuation-in-part of application No. 13/199,671, filed on Sep. 7, 2011, now Pat. No. 8,844,880, and a continuation-in-part of application No. 13/199,684, filed on Sep. 7, 2011, and a continuation-in-part of application No. 13/199,678, filed on Sep. 7, 2011, and a continuation-in-part of application No. 13/199,682, filed on Sep. 7, 2011, and a continuation-in-part of application No. 13/199,681, filed on Sep. 7, 2011, and (Continued)

(51) Int. Cl.
*B64C 27/82* (2006.01)
*B64C 27/02* (2006.01)

(52) U.S. Cl.
CPC .............. *B64C 27/82* (2013.01); *B64C 27/025* (2013.01); *B64C 2027/8245* (2013.01); *B64C 2027/8254* (2013.01)
USPC ........................... 244/17.21; 244/8; 244/17.11

(58) Field of Classification Search
USPC ................. 244/6, 7 R, 8, 17.11, 17.19, 17.21
See application file for complete search history.

(56) References Cited

U.S. PATENT DOCUMENTS

| 2,369,652 | A | * | 2/1945 | Avery | 244/17.13 |
|---|---|---|---|---|---|
| 2,383,038 | A | * | 8/1945 | Bossi | 244/17.21 |
| 2,419,604 | A | * | 4/1947 | Stanley | 60/698 |
| 3,576,299 | A | * | 4/1971 | Hanson | 244/17.19 |
| 3,591,109 | A | * | 7/1971 | McLarty | 244/17.23 |
| 3,957,226 | A | | 5/1976 | Daggett, Jr. et al. | |
| 4,046,335 | A | * | 9/1977 | Osberger | 244/17.19 |
| 4,099,671 | A | | 7/1978 | Leibach | |
| 4,200,252 | A | | 4/1980 | Logan et al. | |
| 4,239,977 | A | * | 12/1980 | Strutman | 290/44 |
| 4,660,785 | A | * | 4/1987 | Munski | 244/17.19 |
| 4,815,937 | A | * | 3/1989 | Aubry et al. | 416/140 |
| 4,953,811 | A | * | 9/1990 | Smith | 244/17.19 |
| 5,123,613 | A | * | 6/1992 | Piasecki | 244/17.19 |
| 5,131,603 | A | * | 7/1992 | Meyers | 244/17.19 |
| 5,209,430 | A | | 5/1993 | Wilson et al. | |

(Continued)

FOREIGN PATENT DOCUMENTS

JP 02293300 A * 12/1990 .............. B64C 27/82

*Primary Examiner* — Joseph W Sanderson
(74) *Attorney, Agent, or Firm* — Pate Baird, PLLC

(57) ABSTRACT

Apparatus and methods for controlling yaw of a rotorcraft in the event of one or both of low airspeed and engine failure are disclosed. A yaw propulsion provides a yaw moment at low speeds. The yaw propulsion device may be an air jet or a fan. A pneumatic fan may be driven by compressed air released into a channel surrounding an outer portion of the fan. The fan may be driven by hydraulic power. Power for the yaw propulsion device and other system may be provided by a hydraulic pump and/or generator engaging the rotor. Low speed yaw control may be provided by auxiliary rudders positioned within the stream tube of a prop. The auxiliary rudders may one or both of fold down and disengage from rudder controls when not in use.

17 Claims, 24 Drawing Sheets

Related U.S. Application Data a continuation-in-part of application No. 13/199,677, filed on Sep. 7, 2011, and a continuation-in-part of application No. 13/199,679, filed on Sep. 7, 2011, now Pat. No. 8,668,162, and a continuation-in-part of application No. 13/199,720, filed on Sep. 7, 2011, and a continuation-in-part of application No. 13/199,719, filed on Sep. 7, 2011, now abandoned, and a continuation-in-part of application No. 13/199,721, filed on Sep. 7, 2011, and a continuation-in-part of application No. 13/199,705, filed on Sep. 7, 2011, and a continuation-in-part of application No. 13/199,712, filed on Sep. 7, 2011.

(60) Provisional application No. 61/460,572, filed on Jan. 3, 2011, provisional application No. 61/466,177, filed on Mar. 22, 2011, provisional application No. 61/409,475, filed on Nov. 2, 2010, provisional application No. 61/409,478, filed on Nov. 2, 2010, provisional application No. 61/409,476, filed on Nov. 2, 2010, provisional application No. 61/409,482, filed on Nov. 2, 2010, provisional application No. 61/409,470, filed on Nov. 2, 2010, provisional application No. 61/517,413, filed on Apr. 19, 2011, provisional application No. 61/468,964, filed on Mar. 29, 2011, provisional application No. 61/409,487, filed on Nov. 2, 2010, provisional application No. 61/409,494, filed on Nov. 2, 2010, provisional application No. 61/456,219, filed on Nov. 2, 2010, provisional application No. 61/456,221, filed on Nov. 2, 2010, provisional application No. 61/456,220, filed on Nov. 2, 2010, provisional application No. 61/432,488, filed on Jan. 13, 2011, provisional application No. 61/506,572, filed on Jul. 11, 2011, provisional application No. 61/519,075, filed on May 16, 2011, provisional application No. 61/519,055, filed on May 16, 2011, provisional application No. 61/460,573, filed on Jan. 4, 2011, provisional application No. 61/461,223, filed on Jan. 13, 2011, provisional application No. 61/429,282, filed on Jan. 3, 2011, provisional application No. 61/429,289, filed on Jan. 3, 2011, provisional application No. 61/575,196, filed on Aug. 17, 2011, provisional application No. 61/499,996, filed on Jun. 22, 2011, provisional application No. 61/575,204, filed on Aug. 18, 2011, provisional application No. 61/532,233, filed on Sep. 8, 2011, provisional application No. 61/539,668, filed on Sep. 27, 2011, provisional application No. 61/626,783, filed on Oct. 3, 2011, provisional application No. 61/381,291, filed on Sep. 9, 2010, provisional application No. 61/403,099, filed on Sep. 9, 2010, provisional application No. 61/403,097, filed on Sep. 9, 2010, provisional application No. 61/381,313, filed on Sep. 9, 2010, provisional application No. 61/403,111, filed on Sep. 9, 2010, provisional application No. 61/381,347, filed on Sep. 9, 2010, provisional application No. 61/403,136, filed on Sep. 9, 2010, provisional application No. 61/403,134, filed on Sep. 9, 2010, provisional application No. 61/403,098, filed on Sep. 9, 2010, provisional application No. 61/403,081, filed on Sep. 9, 2010, provisional application No. 61/403,135, filed on Sep. 9, 2010, provisional application No. 61/403,113, filed on Sep. 9, 2010.

(56) References Cited

U.S. PATENT DOCUMENTS

| | | | | |
|---|---|---|---|---|
| 5,240,205 | A * | 8/1993 | Allongue | 244/17.19 |
| 6,352,220 | B1 | 3/2002 | Banks et al. | |
| 7,032,860 | B1 * | 4/2006 | Kirk et al. | 244/17.19 |
| 7,231,997 | B2 * | 6/2007 | De Roche | 180/116 |
| RE42,446 | E * | 6/2011 | Kirk et al. | 244/17.19 |
| 7,959,105 | B2 * | 6/2011 | Marze | 244/17.19 |
| 8,167,233 | B2 * | 5/2012 | Brody et al. | 244/17.21 |
| 8,196,855 | B2 * | 6/2012 | Balkus, Jr. | 244/17.19 |
| 8,286,908 | B2 * | 10/2012 | Kebrle et al. | 244/17.19 |
| 2006/0169835 | A1 * | 8/2006 | Maille et al. | 244/17.19 |
| 2009/0014581 | A1 * | 1/2009 | Kebrle et al. | 244/17.21 |
| 2009/0159740 | A1 * | 6/2009 | Brody et al. | 244/17.21 |
| 2010/0072760 | A1 * | 3/2010 | Anderson et al. | 290/1 R |
| 2011/0121128 | A1 * | 5/2011 | Balkus, Jr. | 244/17.21 |

* cited by examiner

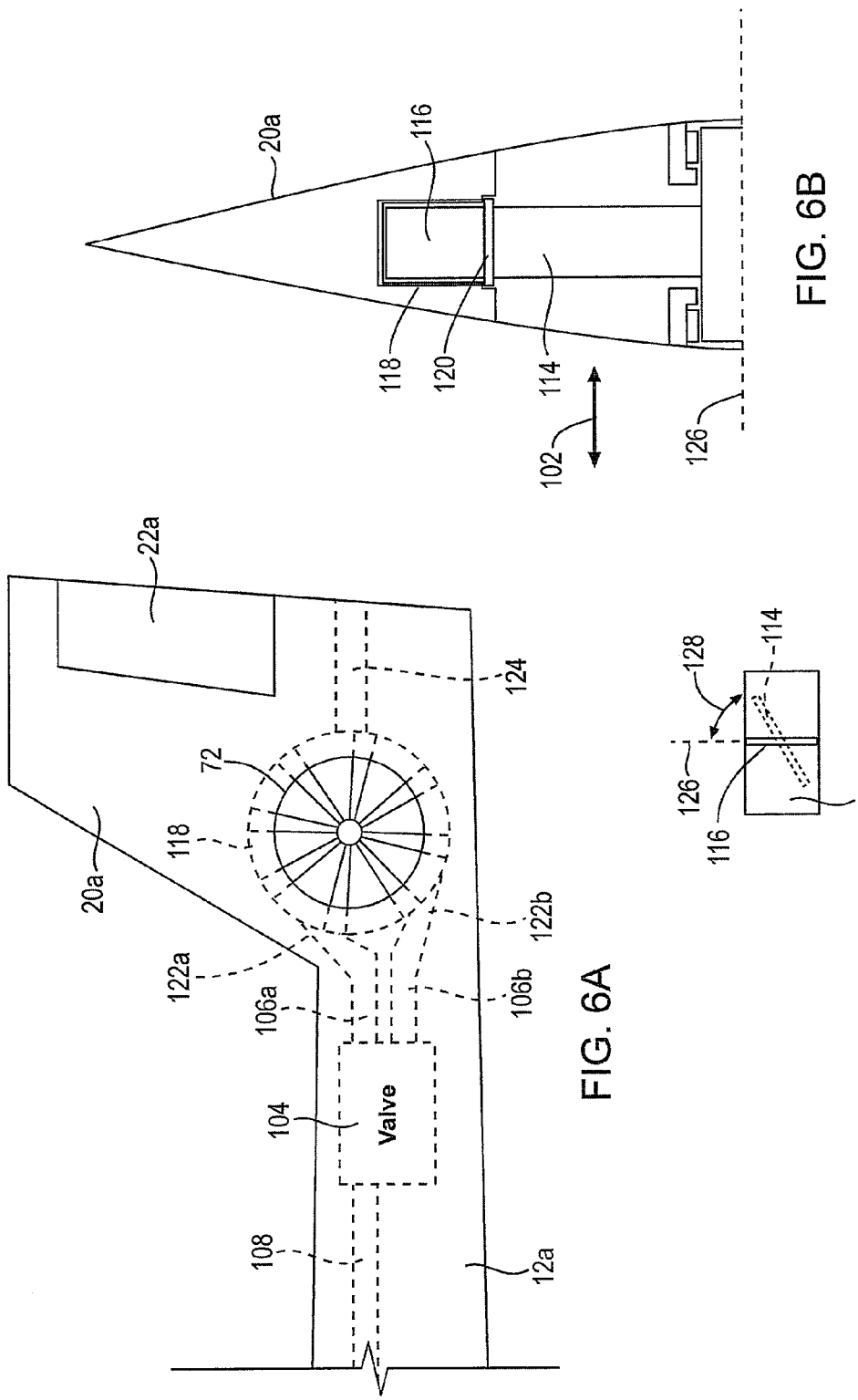

TAIL FAN APPARATUS AND METHOD FOR LOW SPEED YAW CONTROL OF A ROTORCRAFT

RELATED APPLICATIONS

This application claims the benefit of U.S. Provisional Application Ser. No. 61/409,475 and U.S. Provisional Application Ser. No. 61/409,476. This application incorporates by reference all of the following U.S. Provisional Patent Application Ser. No. 61/460,572, filed on Jan. 3, 2011, U.S. Provisional Patent Application Ser. No. 61/466,177, filed on Mar. 22, 2011, U.S. Provisional Patent Application Ser. No. 61/409,475, filed on Nov. 2, 2010, U.S. Provisional Patent Application Ser. No. 61/409,478, filed on Nov. 2, 2010, U.S. Provisional Patent Application Ser. No. 61/409,476, filed on Nov. 2, 2010, U.S. Provisional Patent Application Ser. No. 61/409,482, filed on Nov. 2, 2010, U.S. Provisional Patent Application Ser. No. 61/409,470, filed on Nov. 2, 2010, U.S. Provisional Patent Application Ser. No. 61/517,413, filed on Apr. 19, 2011, U.S. Provisional Patent Application Ser. No. 61/468,964, filed on Mar. 29, 2011, U.S. Provisional Patent Application Ser. No. 61/409,487, filed on Nov. 2, 2010, U.S. Provisional Patent Application Ser. No. 61/409,494, filed on Nov. 2, 2010, U.S. Provisional Patent Application Ser. No. 61/456,219, filed on Nov. 2, 2010, U.S. Provisional Patent Application Ser. No. 61/456,221, filed on Nov. 2, 2010, U.S. Provisional Patent Application Ser. No. 61/456,220, filed on Nov. 2, 2010, U.S. Provisional Patent Application Ser. No. 61/432,488, filed on Jan. 13, 2011, U.S. Provisional Patent Application Ser. No. 61/506,572, filed on Jul. 11, 2011, U.S. Provisional Patent Application Ser. No. 61/519,075, filed on May 16, 2011, U.S. Provisional Patent Application Ser. No. 61/519,055, filed on Aug. 22, 2011, U.S. Provisional Patent Application Ser. No. 61/460,573, filed on Jan. 4, 2011, U.S. Provisional Patent Application Ser. No. 61/461,223, filed on Jan. 13, 2011, U.S. Provisional Patent Application Ser. No. 61/429,282, filed on Jan. 3, 2011, U.S. Provisional Patent Application Ser. No. 61/429,289, filed on Jan. 3, 2011, U.S. Provisional Patent Application Ser. No. 61/575,196, filed on Aug. 17, 2011, U.S. Provisional Patent Application Ser. No. 61/499,996, filed on Jun. 22, 2011, U.S. Provisional Patent Application Ser. No. 61/575,204, filed on Aug. 17, 2011, U.S. Provisional Patent Application Ser. No. 61/532,233, filed on Sep. 8, 2011, U.S. Provisional Patent Application Ser. No. 61/539,668, filed on Sep. 27, 2011, and U.S. Provisional Patent Application Ser. No. 61/626,783, filed on Oct. 3, 2011; and is a continuation-in-part of co-pending U.S. patent application Ser. No. 13/199,671, filed on Sep. 7, 2011, which claims the benefit of U.S. Provisional Patent Application Ser. No. 61/381,291, filed on Sep. 9, 2010, co-pending U.S. patent application Ser. No. 13/199,684, filed on Sep. 7, 2011, which claims the benefit of U.S. Provisional Patent Application Ser. No. 61/403,099, filed on Sep. 9, 2010, co-pending U.S. patent application Ser. No. 13/199,678, filed on Sep. 7, 2011, which claims the benefit of U.S. Provisional Patent Application Ser. No. 61/403,097, filed on Sep. 9, 2010, co-pending U.S. patent application Ser. No. 13/199,682, filed on Sep. 7, 2011, which claims the benefit of U.S. Provisional Patent Application Ser. No. 61/381,313, filed on Sep. 9, 2010, co-pending U.S. patent application Ser. No. 13/199,681, filed on Sep. 7, 2011, which claims the benefit of U.S. Provisional Patent Application Ser. No. 61/403,111, filed on Sep 9, 2010, co-pending U.S. patent application Ser. No. 13/199,677, filed on Sep 7, 2011, which claims the benefit of U.S. Provisional Patent Application Ser. No. 61/381,347, filed on Sep. 9, 2010, co-pending U.S. patent application Ser. No. 13/199,679, filed on Sep. 7, 2011, which claims the benefit of U.S. Provisional Patent Application Ser. No. 61/403,136, filed on Sep. 9, 2010, co-pending U.S. patent application Ser. No. 13/199,720, filed on Sep. 7, 2011, which claims the benefit of U.S. Provisional Patent Application Ser. No. 61/403,134, filed on Sep. 9, 2010, co-pending U.S. patent application Ser. No. 13/199,719, filed on Sep. 7, 2011, which claims the benefit of U.S. Provisional Patent Application Ser. No. 61/403,098, filed on Sep. 9, 2010, co-pending U.S. patent application Ser. No. 13/199,721, filed on Sep. 7, 2011, which claims the benefit of U.S. Provisional Patent Application Ser. No. 61/403,081, filed on Sep. 9, 2010, co-pending U.S. patent application Ser. No. 13/199,705, filed on Sep. 7, 2011, which claims the benefit of U.S. Provisional Patent Application Ser. No. 61/403,135, filed on Sep. 9, 2010, and co-pending U.S. patent application Ser. No. 13/199,712, filed on Sep. 7, 2011, which claims the benefit of U.S. Provisional Patent Application Ser. No. 61/403,113, filed on Sep. 9, 2010, all of which are hereby incorporated by reference.

Additionally, this patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H.F. Pitcairn.

BACKGROUND

1. The Field of the Invention

This invention relates to rotating wing aircraft, and, more particularly to rotating wing aircraft relying on autorotation of a rotor to provide lift.

2. The Background Art

Rotating wing aircraft rely on a rotating wing to provide lift. In contrast, fixed wing aircraft rely on air flow over a fixed wing to provide lift. Fixed wing aircraft must therefore achieve a minimum ground velocity on takeoff before the lift on the wing is sufficient to overcome the weight of the plane. Fixed wing aircraft therefore generally require a long runway along which to accelerate to achieve this minimum velocity and takeoff.

In contrast, rotating wing aircraft can take off and land vertically or along short runways inasmuch as powered rotation of the rotating wing provides the needed lift. This makes rotating wing aircraft particularly useful for landing in urban locations or undeveloped areas without a proper runway.

The most common rotating wing aircraft in use today are helicopters. A helicopter typically includes a fuselage, housing an engine and passenger compartment, and a rotor, driven by the engine, to provide lift. Forced rotation of the rotor causes a reactive torque on the fuselage. Accordingly, conventional helicopters require either two counter rotating rotors or a tail rotor in order to counteract this reactive torque.

Another type of rotating wing aircraft is the autogyro. An autogyro aircraft derives lift from an unpowered, freely rotating rotor or plurality of rotary blades. The energy to rotate the rotor results from a windmill-like effect of air passing through the underside of the rotor. The forward movement of the aircraft comes in response to a thrusting engine such as a motor driven propeller mounted fore or aft.

During the developing years of aviation aircraft, autogyro aircraft were proposed to avoid the problem of aircraft stalling in flight and to reduce the need for runways. The relative airspeed of the rotating wing is independent of the forward airspeed of the autogyro, allowing slow ground speed for takeoff and landing, and safety in slow-speed flight. Engines may be tractor-mounted on the front of an autogyro or pusher-mounted on the rear of the autogyro.

Airflow passing the rotary wing, alternately called rotor blades, which are tilted upward toward the front of the autogyro, act somewhat like a windmill to provide the driving force to rotate the wing, i.e. autorotation of the rotor. The Bernoulli effect of the airflow moving over the rotor surface creates lift.

Various autogyro devices in the past have provided some means to begin rotation of the rotor prior to takeoff, thus further minimizing the takeoff distance down a runway. One type of autogyro is the "gyrodyne," which includes a gyrodyne built by Fairey aviation in 1962 and the XV-1 convertiplane first flight tested in 1954. The gyrodyne includes a thrust source providing thrust in a flight direction and a large rotor for providing autorotating lift at cruising speeds. To provide initial rotation of the rotor, jet engines were secured to the tip of each blade of the rotor and powered during takeoff, landing, and hovering.

At high speeds, the direction and orientation of an autogyro may be readily controlled using conventional control surfaces such as ailerons, rudders, elevators, and the like, that are exposed to air flow over the airframe of the autogyro. Pitch and roll may also be controlled by cyclically altering the pitch of the blades in order to increase the lift at a certain point in the rotation of each blade. Pitch and roll may also be controlled by altering the angle of the mast coupling the rotor to the airframe.

In an emergency landing when an autogyro has lost power, the airspeed of the autogyro is likely to be low due to a lack of propulsion. Where cross winds are present yaw control may be critical in order to maintain the autogyro aligned with a runway. At low airspeeds, pitch and roll may still be accomplished using cyclic pitch and mast tilt controls inasmuch as the rotor typically is still auto-rotating.

However, yaw control is not readily accomplished at low air speeds using conventional control surfaces. Control surfaces, such as rudders, may not have sufficient airflow thereover at low speeds to induce a yaw moment. In addition, autogyros typically do not have a tail rotor coupled to the engine to counteract torque exerted by the engine on the rotor as do helicopters.

In view of the foregoing, it would be an advancement in the art to provide means for controlling yaw of an autogyro at low speeds and, in particular, for controlling yaw of an autogyro in the event of engine failure.

BRIEF SUMMARY OF THE INVENTION

The invention has been developed in response to the present state of the art and, in particular, in response to the problems and needs in the art that have not yet been fully solved by currently available apparatus and methods. The features and advantages of the invention will become more fully apparent from the following description and appended claims, or may be learned by practice of the invention as set forth hereinafter.

Consistent with the foregoing, a rotorcraft in accordance with an embodiment of the invention may include an airframe, a rotor rotatably mounted to the airframe and rotatable about an axis of rotation, a vertical stabilizer mounted to the airframe offset from the axis of rotation, and an emergency power supply mounted to the airframe. A fan is mounted to the vertical stabilizer and is selectively coupled to the emergency power supply to drive the fan in forward and reverse directions in order to generate a yaw moment. In one method of use, the emergency power supply is coupled to the fan in the event that failure of an engine of the rotorcraft is detected.

For example, a method of use may include urging the rotorcraft translationally under power of the engine while leaving the fan unpowered. Upon detecting a loss of power of the engine, the emergency power supply is coupled to the fan in proportion to yaw control inputs from a pilot.

In another aspect of the invention, the emergency power supply includes a reservoir of compressed air. In such embodiments, the fan may be coupled to a pneumatic motor for driving the fan. Air from the reservoir may be supplied to the pneumatic motor in accordance with pilot inputs in order to control yaw of the rotorcraft.

In another aspect of the invention, the fan includes inner blades and outer blades, positioned radially outwardly from the inner blades. A ring extends circumferentially around the inner blades and is positioned radially between the inner blades and outer blades. The outer blades are positioned within a channel such that the ring and channel form an annular cavity and the ring hinders or restricts escape of air from the channel. Compressed air from the reservoir may be selectively released into the channel in order to drive the fain.

In another aspect of the invention, a hydraulic motor is coupled to the fan to drive the fan. In such embodiments, the emergency power supply may include a hydraulic reservoir having a bladder of compressed air therein for urging the hydraulic fluid out of the reservoir. Fluid from the reservoir may be coupled to the hydraulic motor in accordance with pilot inputs in order to drive the fan.

In another aspect of the invention, the emergency power supply includes at least one of a hydraulic pump and a generator selective engageable and rotatably coupled to the rotor. For example, a belt, gear, or other drive mechanism may engage the rotor and a drive wheel of one or both of the hydraulic pump and generator. A generator may be used to assure power availability electrical power for any and all aircraft uses of electricity, controls, instruments, battery charging, or the like.

A flight control system for performing the above described methods using the above described apparatus is also disclosed and claimed herein.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 6A is a partial side elevation view of an aircraft incorporating a pneumatic tail fan for yaw control;

FIG. 6B is a partial top plan cross-sectional view of the aircraft of FIG. 6A;

FIG. 6C is a partial top plan view of a pneumatic tail fan for yaw control;

DETAILED DESCRIPTION OF THE PREFERRED EMBODIMENTS

Figure 1:
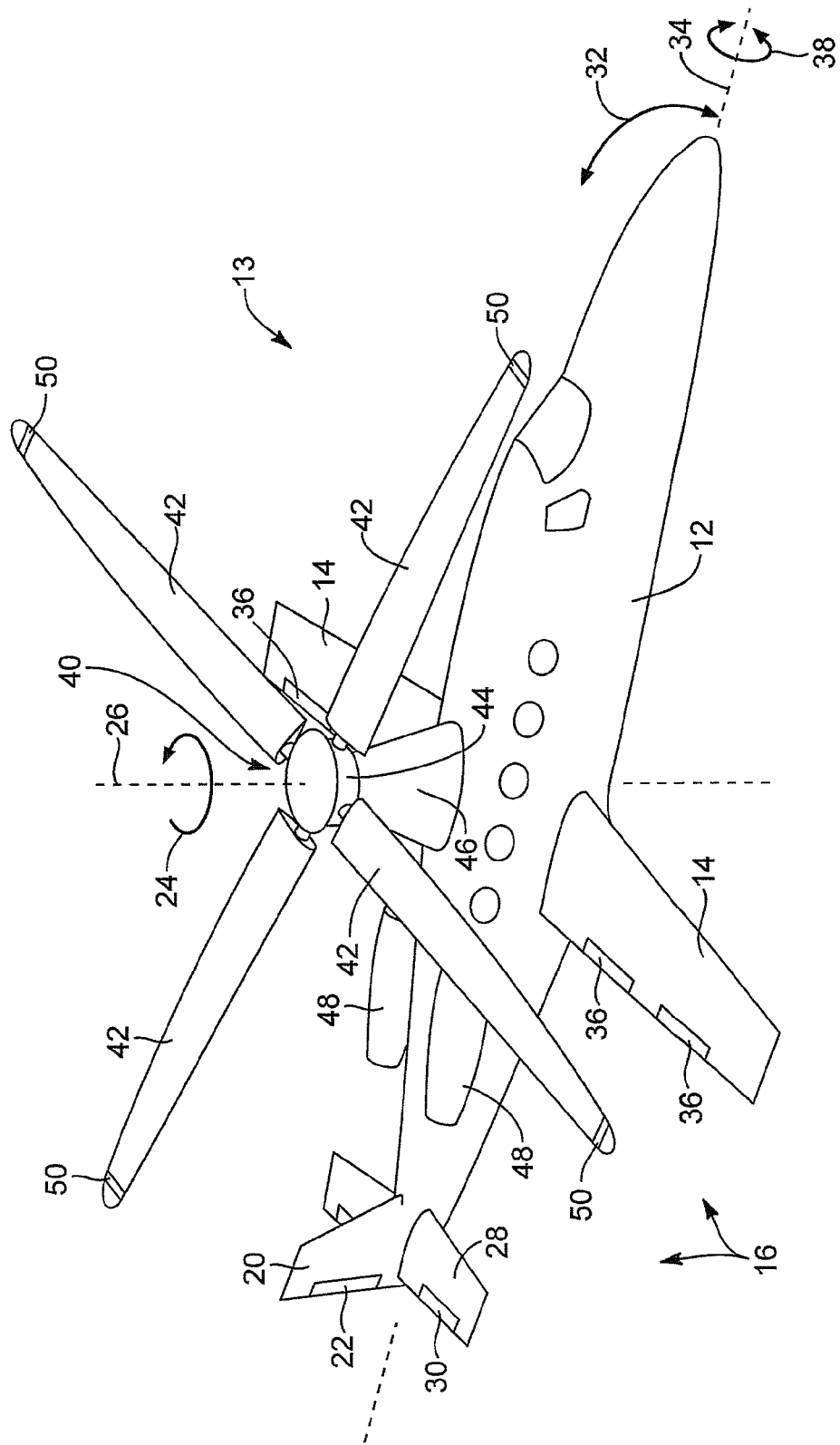
FIG. 1 is an isometric view of an aircraft in accordance with an embodiment of the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

This patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

Referring to FIG. 1, an aircraft 10 includes a fuselage 12 defining a cabin for carrying an operator, passengers, cargo, or the like. The fuselage 12 may include one or more fixed wings 14 shaped as airfoils for providing lift to the aircraft. The wings 14 may be configured such that they provide sufficient lift to overcome the weight of the aircraft 10 only at comparatively high speeds inasmuch as the aircraft 10 is capable of vertical takeoff and landing (VTOL) and does not need lift from the fixed wings 14 at low speeds, e.g. below 50 mph or even 100 mph upon taking off.

In this manner, the wings 14 may be made smaller than those of fixed wing aircraft requiring a high velocity takeoff, which results in lower drag at higher velocities. In some embodiments the wings 14 provide sufficient lift to support at least 50 percent, preferably 90 percent, of the weight of the aircraft 10 at air speeds above 200 mph.

Control surfaces 16 may secure to one or both of the fuselage 12 and wings 14. For example a tail structure 18 may include one or more vertical stabilizer 20 and one or more rudders 22. The rudders 22 may be adjustable as known in the art to control the yaw 24 of the aircraft 10 during flight. As known in the art, yaw 24 is defined as rotation about a vertical axis 26 of the aircraft 10. In the illustrated embodiment, the rudders 22 may comprise hinged portions of the vertical stabilizer 20.

The tail structure 18 may further include a horizontal stabilizer 28 and an elevator 30. The elevator 30 may be adjustable as known in the art to alter the pitch 32 of the aircraft 10. As known in the art, pitch 32 is defined as rotation in a plane containing the vertical axis 26 and a longitudinal axis 34 of the fuselage of an aircraft 10. In the illustrated embodiment, the elevator 30 is a hinged portion of the horizontal stabilizer 28. In some embodiments, twin rudders 22 may be positioned at an angle relative to the vertical axis 26 and serve both to adjust the yaw 24 and pitch 32 of the aircraft 10.

The control surfaces 16 may also include ailerons 36 on the wings 14. As known in the art, ailerons 36 are used to control roll 38 of the airplane. As known in the art, roll 38 is defined as rotation about the longitudinal axis 34 of the aircraft 10.

Lift during vertical takeoff and landing and for augmenting lift of the wings 14 during flight is provided by a rotor 40 comprising a number of individual blades 42. The blades are mounted to a rotor hub 44. The hub 44 is coupled to a mast 46 which couples the rotor hub 44 to the fuselage 12. The rotor 40 may be selectively powered by one or more engines 48 housed in the fuselage 12, or adjacent nacelles, and coupled to the rotor 40. In some embodiments, jets 50 located at or near the tips of the blades 42 power the rotor 40 during takeoff, landing, hovering, or when the flight speed of the aircraft is insufficient to provide sufficient autorotation to develop needed lift.

Figure 2:
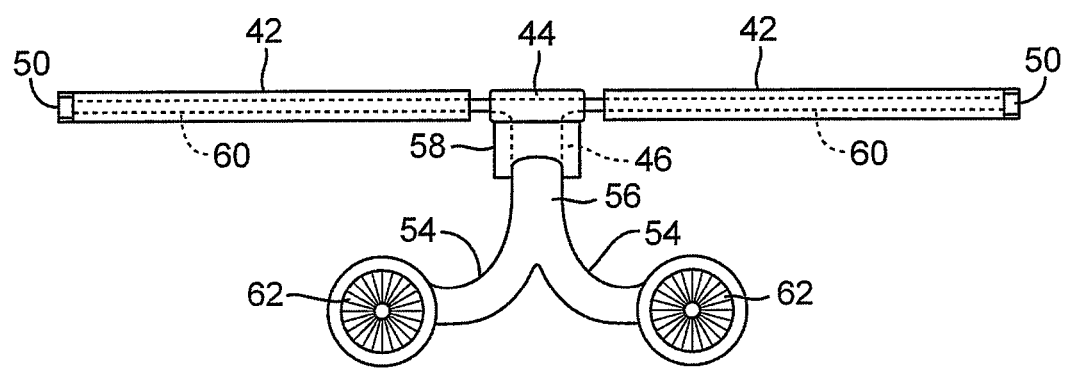
FIG. 2 is a front elevation view of a compressed or otherwise pressurized air supply for a tip jet in accordance with an embodiment of the present invention.

Referring to FIG. 2, while still referring to FIG. 1, in the illustrated embodiment, the engines 48 may be embodied as jet engines 48 that provide thrust during flight of the aircraft. The jet engines 48 may additionally supply compressed air to the jets 46 by driving a bypass turbine 62 or auxiliary compressor. Air compressed by the bypass turbine 62 may be transmitted through ducts 54 to a plenum 56 in fluid communication with the ducts 54.

The plenum 56 is in fluid communication with the mast 46 that is hollow or has another passage to provide for air conduction. A mast fairing 58 positioned around the mast 46 may provide one or both of an air channel and a low drag profile for the mast 46. The mast 46 or mast fairing 58 is in fluid communication with the rotor hub 44. The rotor hub 44 is in fluid communication with blade ducts 60 extending longitudinally through the blades 42 to feed the tip jets 50.

Figure 3A:
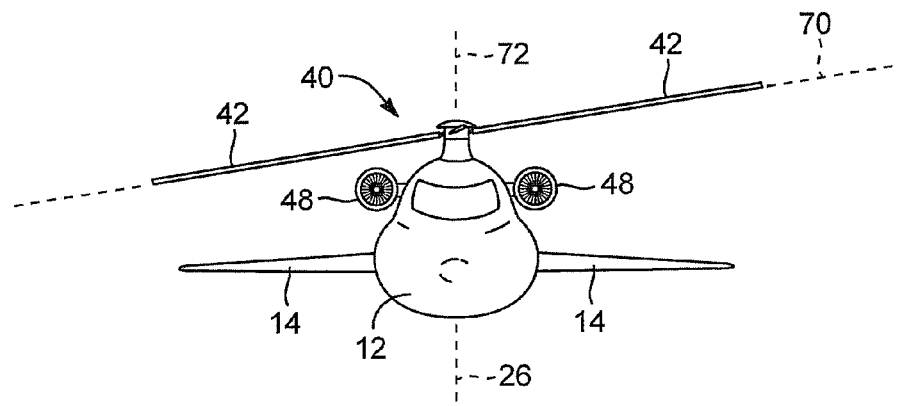
FIG. 3A is a front elevation view of a rotor craft illustrating operational parameters describing a rotor configuration suitable for use in accordance with embodiments of an apparatus and method in accordance with the present invention and the system of FIGS. 1 and 2 in particular.
Figure 3B:
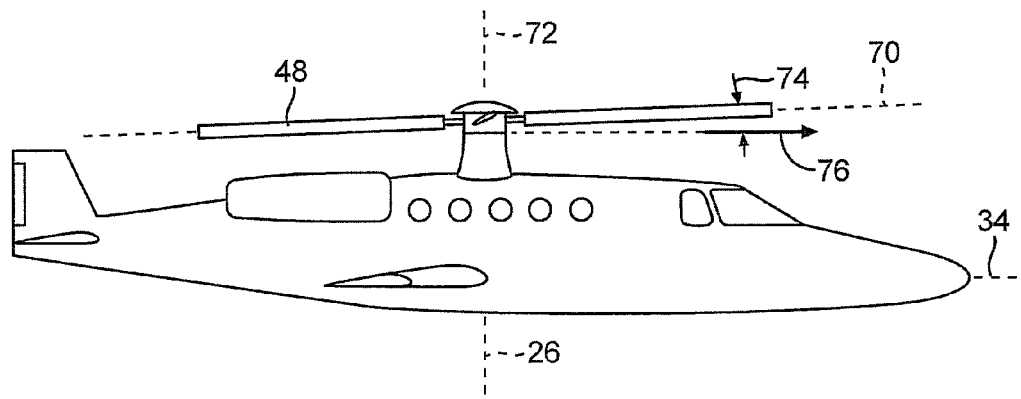
FIG. 3B is a right side elevation view of the rotor craft of FIG. 3A.
Figure 3C:
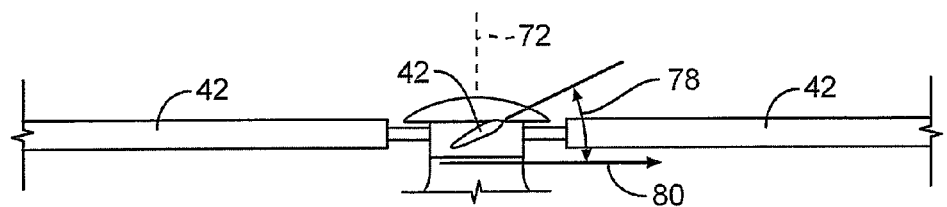
FIG. 3C is a partial cut of a right side elevation view of the rotor of FIG. 3A.

Referring to FIGS. 3A-3C, rotation of the rotor 40 about its axis of rotation 72 occurs in a rotor disc 70 that is generally planar but may be contoured due to flexing of the blades 42 during flight. In general, the rotor disc 70 may be defined as a plane in which the tips of the blades 42 travel. Inasmuch as the blades 42 flap cyclically upward and downward due to changes in lift while advancing and retreating, the rotor disc 70 is angled with respect to the axis of rotation when viewed along the longitudinal axis 34, as shown in FIG. 3A.

Referring to FIG. 3B, the angle 74 of the rotor disc 70, relative to a flight direction 76 in the plane containing the longitudinal axis 34 and vertical axis 26, is defined as the angle of attack 74 or rotor disk angle of attack 74. For purposes of this application, flight direction 76 and air speed refer to the direction and speed, respectively, of the fuselage 12 of the aircraft 10 relative to surrounding air. In autogyro systems, the angle of attack 74 of the rotor disc 70 is generally positive in order to achieve autorotation of the rotor 40, which in turn generates lift.

Referring to FIG. 3C, the surfaces of the blades 42, and particularly the chord of each blade 42, define a pitch angle 78, or blade angle of attack 78, relative to the direction of movement 80 of the blades 42. In general, a higher pitch angle 78 will result in more lift and higher drag on the blade up to the point where stalling occurs, at which point lift has declined below a value necessary to sustain flight. the pitch angle 78 of the blade 42 may be controlled by both cyclic and collective pitch control as known in the art of rotary wing aircraft design.

In the following description power availability is the issue. The power need may be mechanical, electrical, pneumatic, hydraulic, or so forth. Regardless, in each of the alternative embodiments, some portioned power drawn from the autorotating rotor may be directed to a generator providing auxiliary power required to operate the rotorcraft. Likewise, a hydraulic or pneumatic pump by providing alternative, auxiliary power for landing gear controls, etc. for "engine-off" flight conditions.

Figure 4:
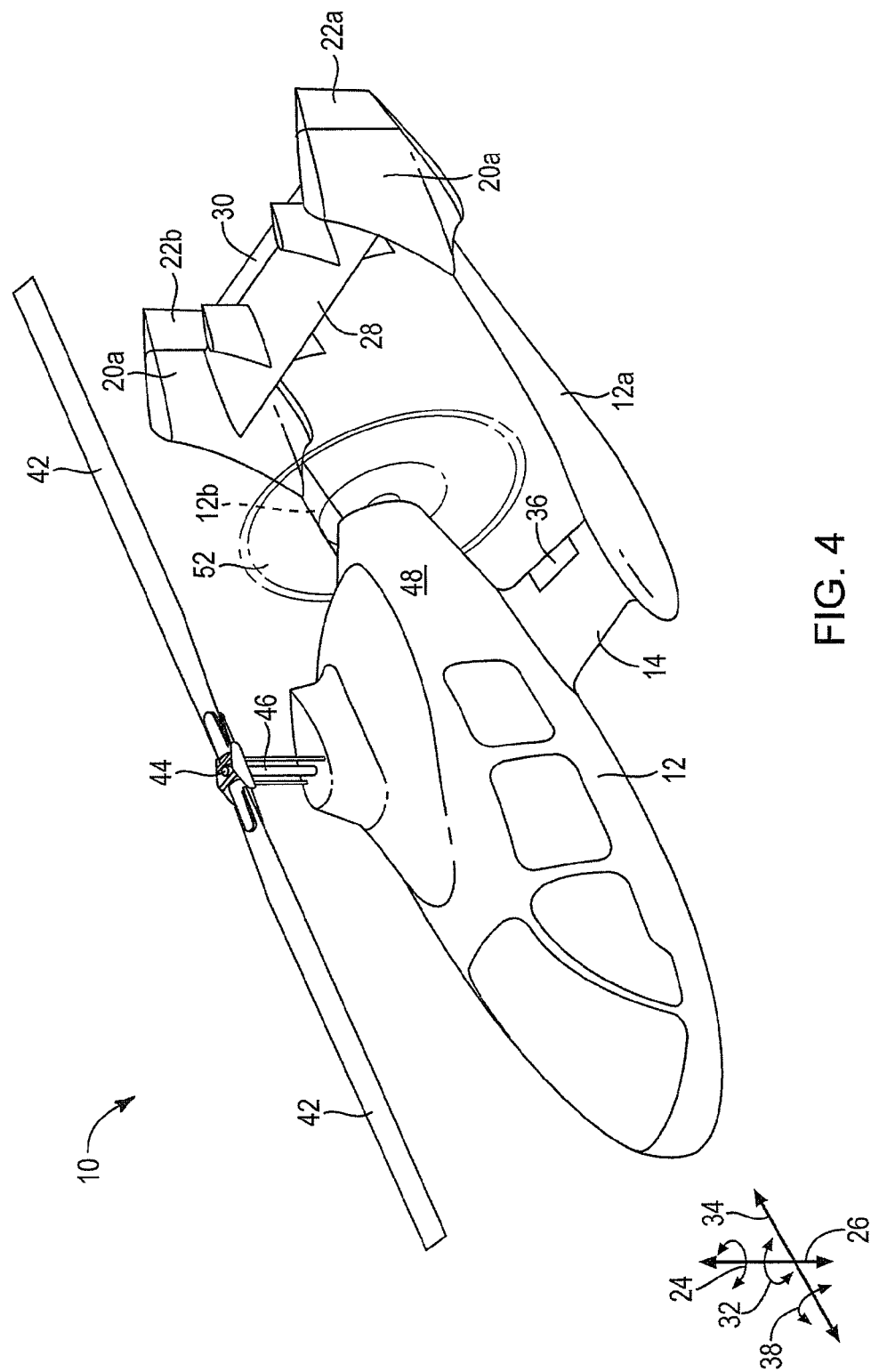
FIG. 4 is an isometric view of an alternative configuration of an aircraft in accordance with an embodiment of the present invention.

FIG. 4 illustrates an alternative configuration for an aircraft 10. In the embodiment of FIG. 4, the airframe 12 includes twin booms 12a, 12b extending rearwardly from the fuselage 12. The horizontal stabilizer 28 mounts to both of the booms 12a, 12b and extends therebetween. Each boom 12a, 12b may also have a vertical stabilizer 20a, 20b mounted thereto. The airframe configuration of FIG. 4 may be propelled by jet engines 48 mounted externally as in FIG. 1 or may be propelled by an internal combustion or turboprop engine 48 mounted internally or externally to the airframe 12. The engine 48 may rotate a propeller 52 or prop 52 in order to propel the aircraft 10 forward. The prop 52 may be located at the front of the airframe or be located between the horizontal stabilizer 28 and the front of the airframe 12.

Figure 5B:
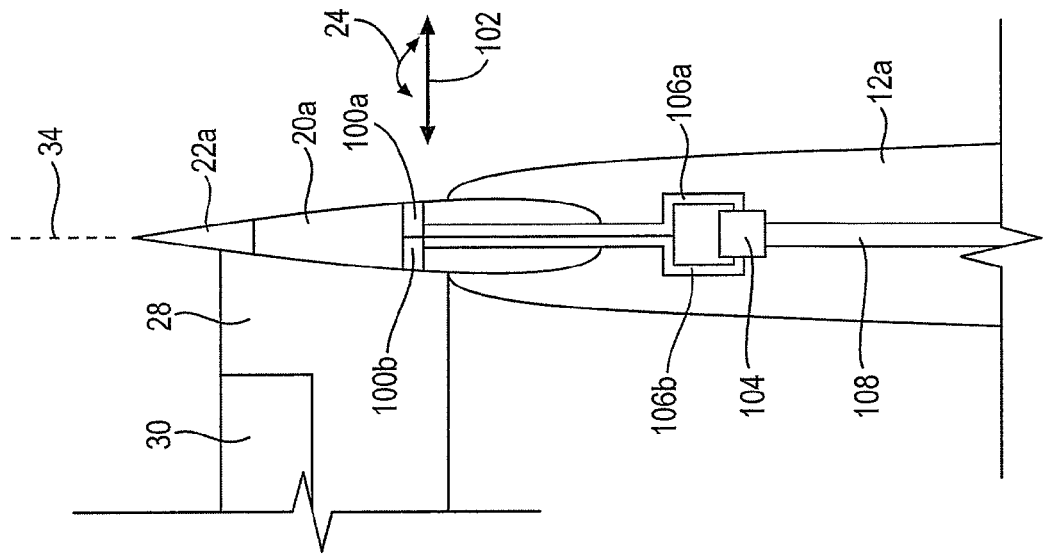
FIG. 5B is a partial top plan cross-sectional view of the aircraft of FIG. 5A.
Figure 5A:
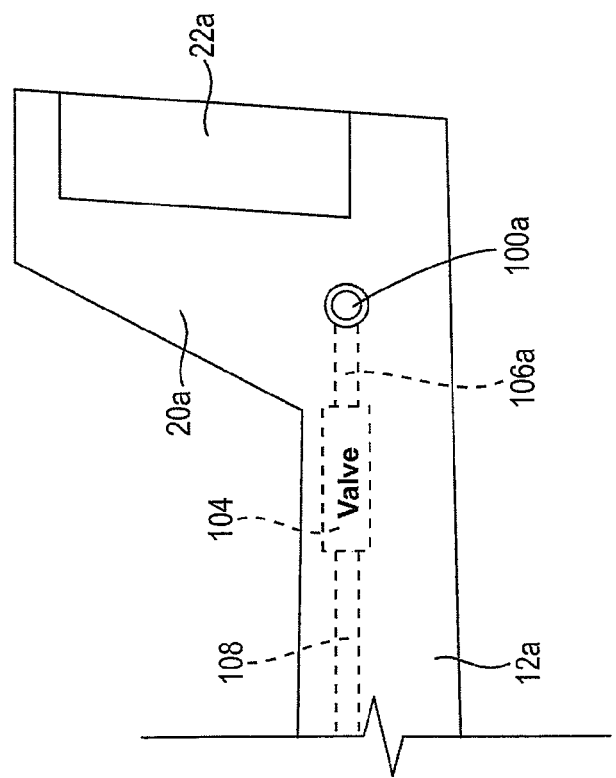
FIG. 5A is a partial side elevation view of an aircraft incorporating air jets for yaw control.

Referring to FIGS. 5A and 5B, in some embodiments, a moment in the yaw direction 24 may be induced by one or more jets 100a, 100b offset from the center of gravity of the aircraft 10 or the axis of rotation 72 of the rotor 40. For example, the jets 100a, 100b may be mounted to one or both of the vertical stabilizer 20a, 20b of FIG. 4 or the vertical stabilizer 20 of FIG. 1. The jets 100a, 100b may also be mounted to the fuselage of the airframe 12 offset from the center of gravity or axis of rotation 72 or to one or both of the booms 12a, 12b.

The jets 100a, 100b may be oriented to direct a jet of air having a major velocity component directed in a transverse direction 102 perpendicular to the longitudinal axis 34 of the aircraft 10. The jet 100a may direct a jet of air in a direction opposite the jet 100b. Air to the jets 100a, 100b may be directed to the jets 100a, 100b by one or more valves 104.

In the illustrated embodiment, a single valve 104 has outputs coupled to the jets 100a, 100b by means of lines 106a, 106b, respectively and an input coupled to a source line 108. the valve 104 may be embodied as an electrically or mechanically controlled, three port, two-way, diverter valve operable to control flow of air at variable rates through either of the lines 106a, 106b or neither of the lines 106a, 106b, responsive to a control input.

The valve 104 may be embodied as multiple independently controlled valves configured to have equivalent function to a three port, two-way, diverter valve. The valve 104 directs air from the source line 108 responsive to electrical or mechanical control inputs from a pilot or autopilot system in order to create a yaw moment due to reactive forces at the jets 100a, 100b.

Referring to FIGS. 6A and 6B, in an alternative embodiment, one or more fans 110 are mounted to the airframe 12, such as to a vertical stabilizer 20, 20a, or 20b. Each fan 110 is positioned within an aperture 112 extending through a portion of the aircraft 10 having an extent parallel to the transverse direction 102, though it may have an extent perpendicular to the transverse direction 102 as well.

In the illustrated embodiment, an aperture 112 extends through the vertical stabilizer 20a of the aircraft 10 of FIG. 4. An aperture 112 may additionally or alternatively extend through the vertical stabilizer 20b. In embodiments such as the aircraft 10 of FIG. 1, an aperture 112 may extend through the vertical stabilizer 20. However, an aperture 112 may additionally or alternatively extend through the airframe 12 or booms 12a, 12b at some other position offset from the center of gravity of the aircraft 10 or the axis of rotation 72 of the rotor.

The fan 110 may include inner blades 114 exposed to air within the aperture 112. The fan 110 may additionally include outer blades 116 that extend internally radially outwardly from the outer diameter of the inner blades 114. The outer blades 116 may project inwardly within the aircraft 10. The inner blades 114 and outer blades 116 may include inner and outer portions of the same blades. In the illustrated embodiment, the outer blades 116 extend internally within the vertical stabilizer 20.

A channel 118 may extend around the fan 110 such that the outer blades 116 are positioned completely or partially within the channel 118. A ring 120 may extend circumferentially around the inner blades 114 positioned between the inner blades 114 and outer blades 116. The ring 120 may extend substantially across the channel, e.g. between about 85 and 100% of the width of the channel at the location of the ring 120. The ring 120 may serve to substantially hinder leakage of air out of the circumferential cavity defined by the channel 118 and ring 120.

The lines 106a, 106b may be in fluid communication with the channel 118 in order to direct air at the outer blades 116 in order to drive the fan 110. The lines 106a, 106b may be in fluid communication with ports 122a, 122b, respectively, in fluid communication with the channel 118. The ports 122a, 122b may direct air from the lines 106a, 106b such that air emitted from the ports 122a, 122b emitted into the channel 118 has a substantial tangential component with respect to the channel 118. The ports 122a, 122b may be oriented such that air from a port 122a, 122b emitted into the channel 118 will have an angular velocity with respect to the axis of rotation of the fan 110 that is opposite that of air emitted from the other port 122b, 122a.

An outlet port 124 may be in fluid communication with the channel 118 in order to permit air flow out of the channel 118. Alternatively, the valve 104 may configured such that the ports 122a, 82b may be coupled to ambient air while compressed air is emitted from the other port 82b, 82a such that an outlet port 124 is not needed.

Referring to FIG. 6C, in some embodiments, the outer blades 116 have a chord oriented parallel to the axis of rotation 126 of the fan 110 such that air emitted into the channel 118 may more effectively drive the outer blades 116. The inner blades 114 may have a chord oriented at a non perpendicular angle 128 relative to the axis of rotation 126 as known in the art of prop design in order to more effectively urge air parallel to the axis of rotation 126.

In embodiments where the inner blades 114 and outer blades 116 are portions of the same blade, the blade may be twisted such that a portion of the inner blade 114 has the illustrated angle 128 while a portion of the outer blade 116 is parallel to the axis of rotation 126. The chord of the inner blade 114 may have an angle that varies with distance from the axis of rotation 126 in order to achieve a desired figure of merit as known in the art of prop design.

Figure 7:
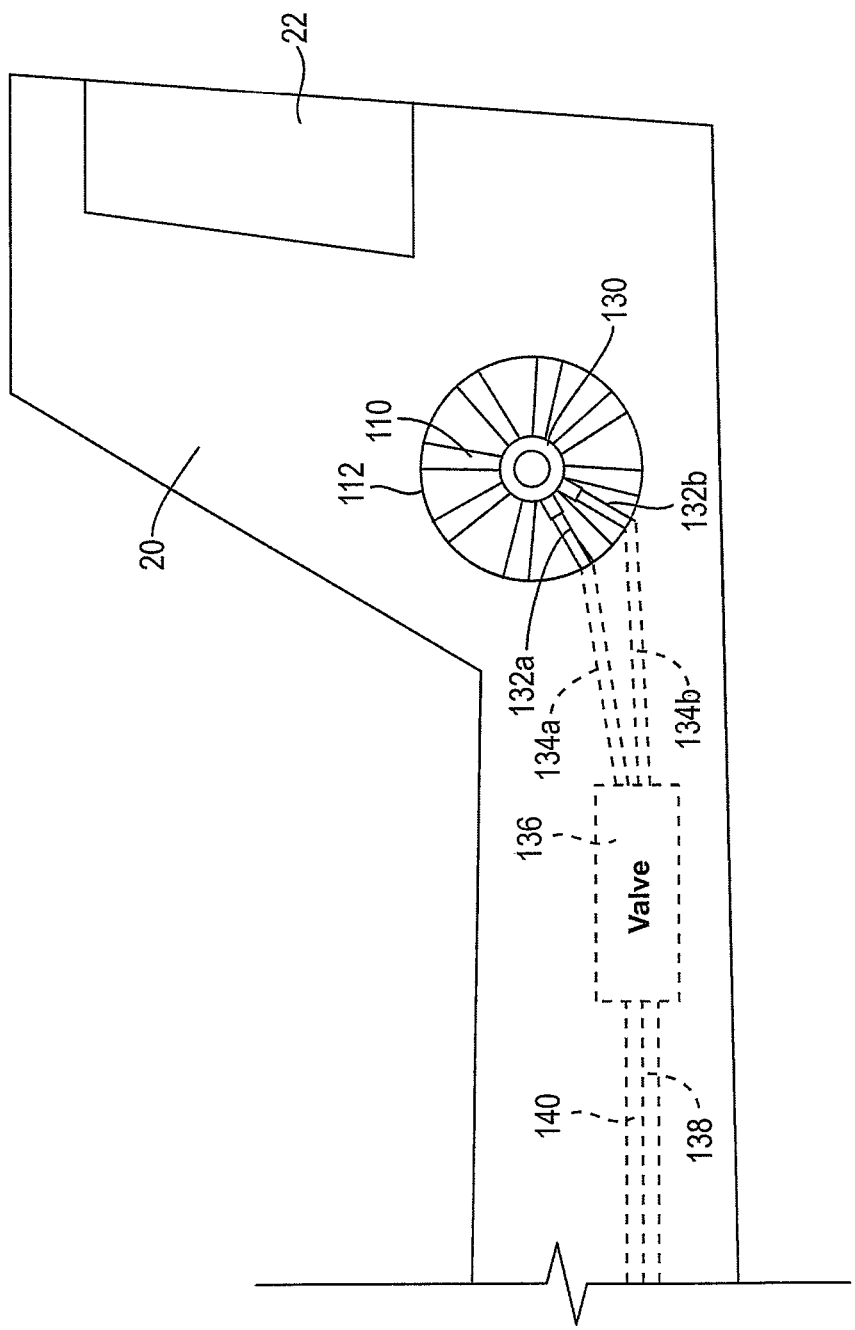
FIG. 7 is a partial side elevation view of an aircraft incorporating a motor-driven tail fan for yaw control.

Referring to FIG. 7, in an alternative embodiment, the fan 110 is coupled to and driven by a pneumatic or hydraulic motor 130 mounted to the airframe 12, such as by mounting the motor 130 to the vertical stabilizer 20. The motor 130 may have inputs 132a, 132b coupled to lines 134a, 134b coupled to a valve 136. In embodiments where the motor 130 is a hydraulic motor 130, the valve 136 may be additionally coupled to a source line 138 and a return line 140. The valve 136 may be an electrically or mechanically controlled valve 136 operable to couple the source line 138 to one of the lines 134a, 134b and the return line 140 to the other of the lines 134b, 134a in response and in proportion to pilot or autopilot inputs.

In embodiments where the motor 130 is a pneumatic motor, a return line 140 may be unnecessary and the valve 136 may be a pneumatic valve operable to couple the source line 138 to one, both, or neither of the lines 134a, 134b in response to and in proportion to pilot or autopilot inputs. It may thus drive the fan 110 and create a controllable yaw moment during one or both of low speed flight and engine failure situations.

Figure 8A:
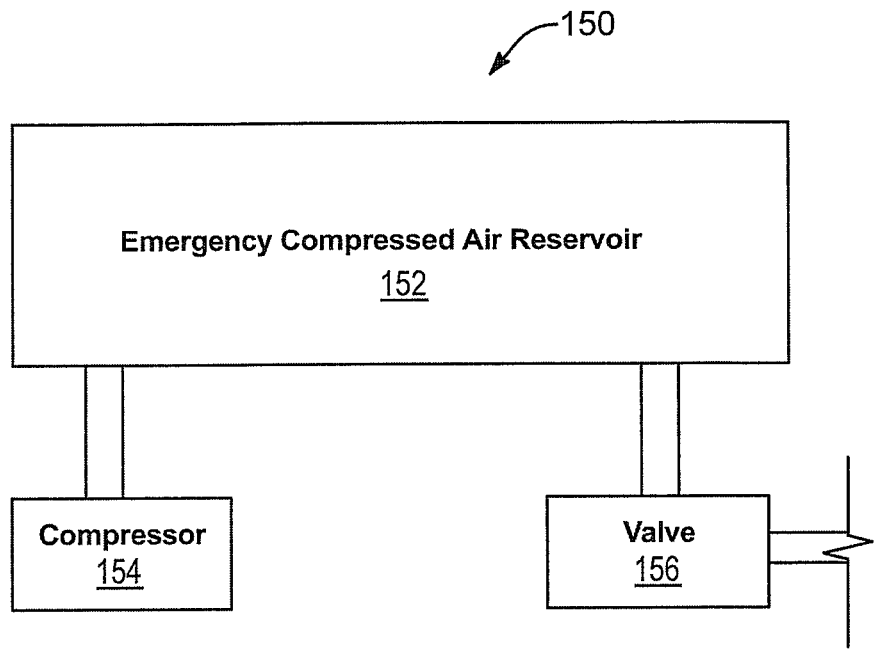
FIGS. 8A through 8C are schematic block diagrams of emergency power supplies.

Referring to FIG. 8A, pneumatic power for the foregoing yaw controls described in FIGS. 5A through 7 and corresponding descriptions may be supplied by the illustrated reserve power supply 150. The reserve power supply 150 may include a compressed air reservoir 152. The reservoir 152 may be filled prior to takeoff of the aircraft 10 and be available for use in the case of an emergency.

Alternatively, a compressor 154 may be coupled to the air reservoir 152. The compressor 154 may receive mechanical or electrical energy derived from the engine 48 or engines 48 in order to maintain pressure within the air reservoir 152 above a threshold. The air reservoir 152 may have other uses during normal operation, e.g., during normal engine operation, and may additionally serve as an emergency power supply upon a loss of engine power.

A valve 156 may couple the air reservoir 152 to the valve 104 or valve 136 of the yaw control systems of FIGS. 5 through 7. The valve 156 may prevent leakage of air from the air reservoir 152 if air were permitted to flow directly from the air reservoir 152 to the valve 104 or valve 136.

For example, the valve 104 or valve 136 may be coupled to conventional yaw controls, e.g., controls for operating a rudder 22, or rudders 22a, 22b, such that the valve 104 or valve 136 is opened and closed responsive to these inputs in a way to generate a yaw moment using the jets 100a, 100b or fan 110 in at least the same direction as the same control input would induce using the rudder. The valve 156 may ensure that no air is released from the air reservoir 152 in response to these inputs until an emergency or other signaling event occurs and the valve 156 is opened.

Alternatively, the valve 156 may be omitted and the valves 104 or valve 136 may exclusively control flow of air from the air reservoir 152. In such an embodiment, pilot controls may be switched in the event of an emergency such that yaw control inputs are coupled to the valve 104 or valve 136. This coupling may occur instead of, or in addition to, that of the rudder 22, or rudders 22a, 22b. This will provide the yaw moment needed to control the aircraft 10 in the event of one or both of low airspeeds and engine failure.

Figure 8B:
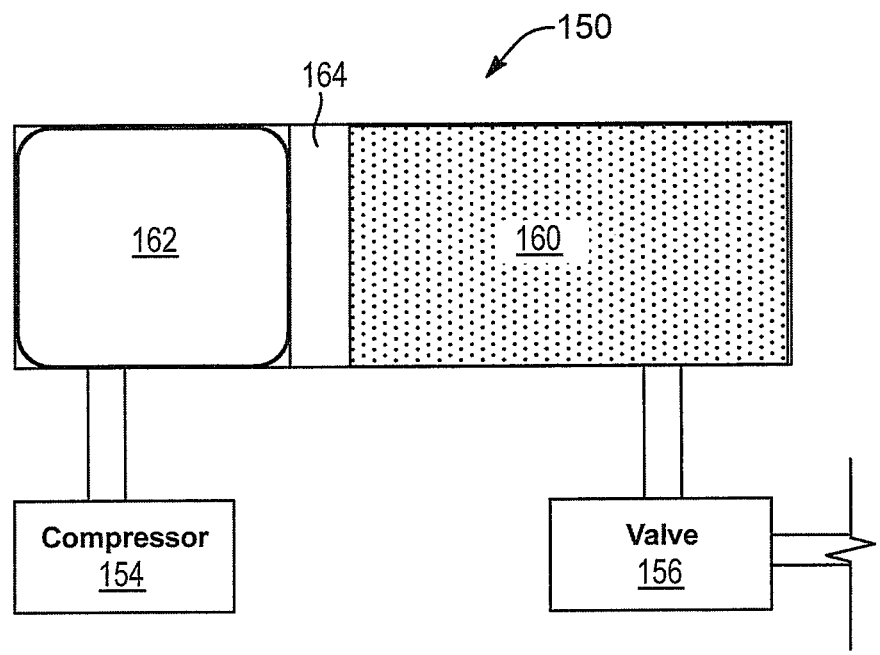

Referring to FIG. 8B, in embodiments including a fan 110 powered by a hydraulic motor 130, the reserve power supply 150 may be embodied as a hydraulic reservoir 160. The hydraulic reservoir 160 may contain a bladder 162 containing compressed air for driving hydraulic fluid from the hydraulic reservoir 160. The bladder 162 may be inflated by a compressor 164 mounted to the airframe 12 and powered by mechanical or electrical energy derived from the engine 48 or may be filled with compressed air prior to takeoff of the aircraft 10. The bladder may be contained as a separator in a vessel or may be replaced by a piston.

The volume of the bladder 162 (or equivalent) may be expandable such that the compressed air within the bladder 162 tends to urge hydraulic fluid outwardly from the reservoir 120. In some embodiments, a piston 164 may be interposed between the bladder 162 and hydraulic fluid within the reservoir 160 such that expansion of the bladder 162 urges the piston against the fluid within the reservoir 160. Alternatively, a bladder may act as a separator in a pressure vessel.

As with the embodiment of FIG. 8A, a valve 156 may control flow of hydraulic fluid to the valve 136 controlling the flow of fluid from the reservoir 162. The valve 156 may be opened in the event of an emergency, as described above with respect to FIG. 8A. Alternatively the valve 136 may exclusively control the flow of fluid to the hydraulic motor 130 and yaw control inputs may be coupled to the valve 136 only in the event of an emergency, as described above with respect to FIG. 8A.

Figure 8C:
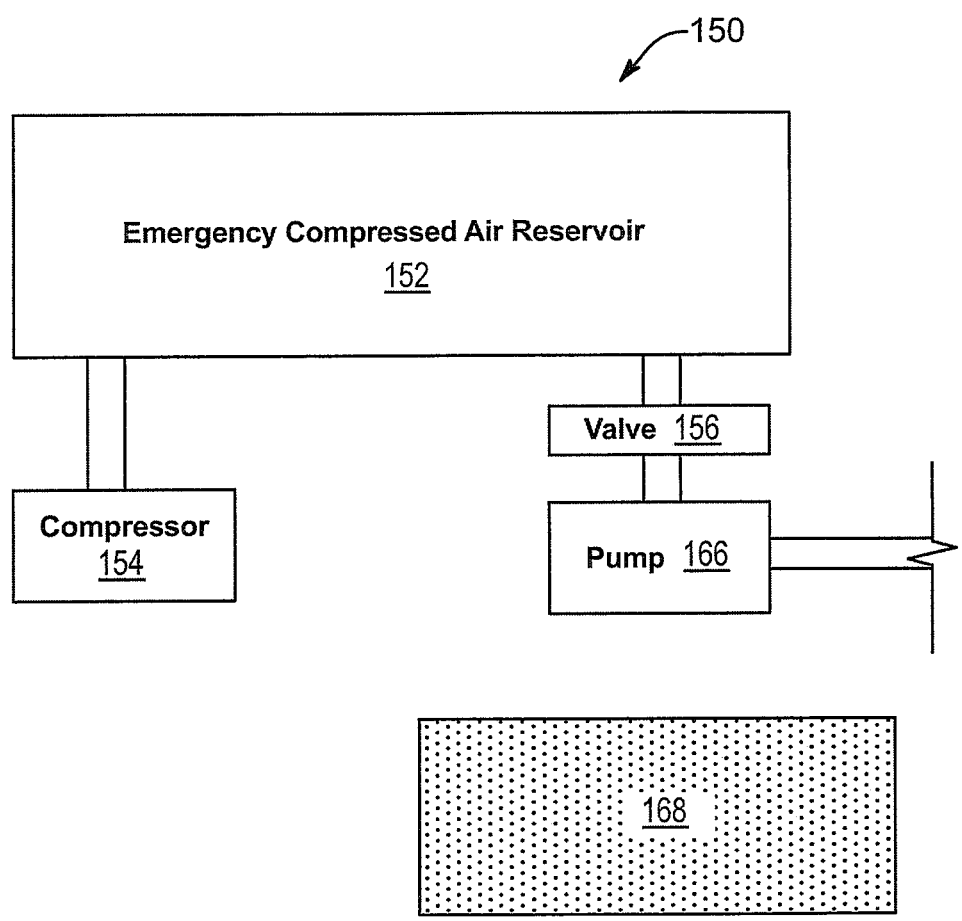

Referring to FIG. 8C, in some embodiments, the air reservoir 152 may be used to power a pneumatic hydraulic pump 166 coupled to a hydraulic reservoir 168. The outlet of the pump 166 may be coupled to the valve 136. In such embodiments, the valve 156 may be used to control flow of air from the reservoir 152 to the pump 166. The valve 156 may be opened in the event of an emergency. In the event of an emergency, the valve 156 may be automatically opened and closed in accordance to feedback as to the pressure of fluid downstream of the pump in order to supply sufficient pressure to operate the hydraulic motor 130 responsive to pilot inputs to the valve 136.

Figure 9A:
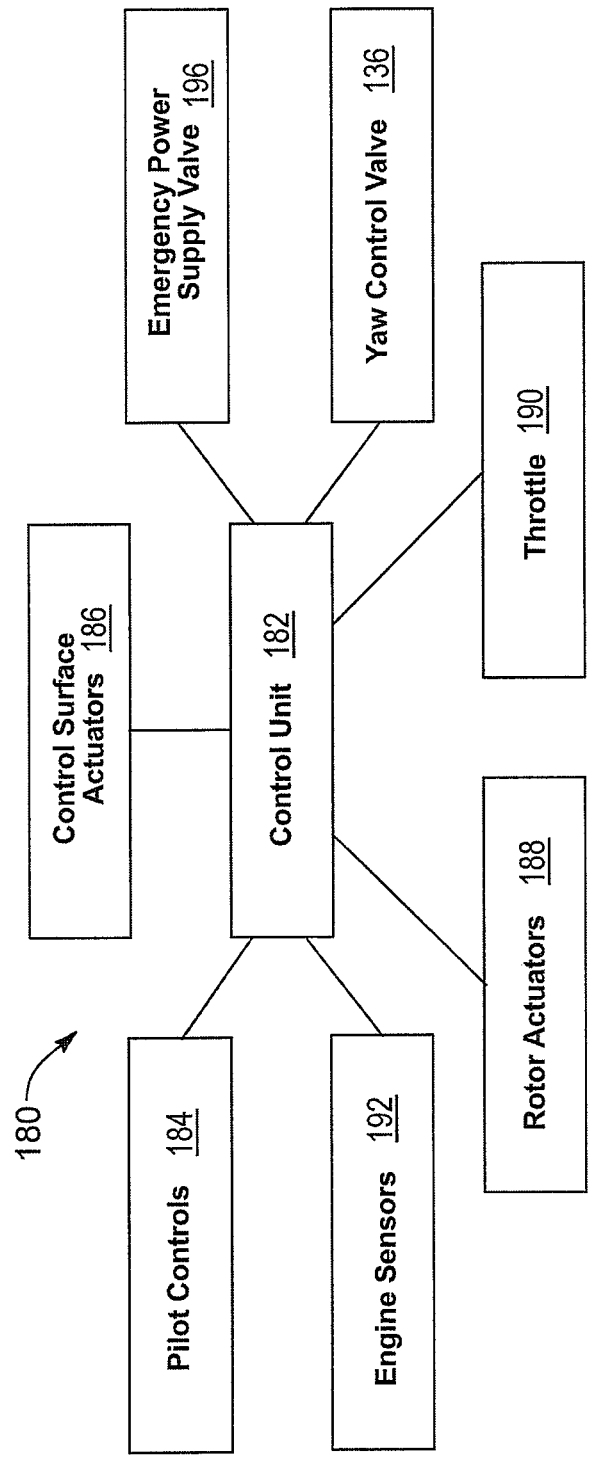
FIGS. 9A and 9B are schematic block diagrams of control systems configured for controlling emergency yaw control propulsion devices.

Referring to FIG. 9A, a control system 180 for an aircraft 10 may include, for example, a control unit 182, pilot controls 184, control surface actuators 186, rotor actuators 188, and throttle 190. The control unit 182 may include conventional avionic computers for performing navigation and autopiloting functions. The control unit 182 may also couple signals from pilot controls 184, such as throttle control, cyclic pitch control, collective pitch control, mast tilt control inputs. The control unit 182 may couple pilot inputs, and controls signals generated by an autopilot computer to the control surface actuators 186, rotor actuators 188, and the throttle 190.

The control surface actuators 186 may include actuators for actuating any ailerons 36, elevators 30, rudders 22, 22a, 22b, and the like. Rotor actuators 188 may include actuators for controlling mast tilt, cyclic pitch, and collective pitch as known in the art of rotorcraft design. In some embodiments, the pilot controls 184 may be coupled directly to the control surface actuators 186, rotor actuators 188, and throttle 190 without an intervening control unit 182.

The control unit 182 may additionally be coupled to the valve 156 of the reserve power supply 150 and the valve 136. The control unit 182 may be operable to detect a loss of power in the engine 48 and, in response, open the valve 156 and couple pilot inputs relating to yaw control, e.g., rudder controls, to the valve 136, or to the valve 104, in order to enable to enable the pilot to control yaw of the aircraft 10. The control unit 182 may be coupled to sensors 192 within the engine 48 or to structures driven by the engine 48 in order to detect whether the engine 48 is outputting sufficient power, or otherwise as known in the art of engine and aircraft design.

In some embodiments, the control unit 182 may open the valve 156 and couple pilot inputs relating to yaw control to the valve 136, or the valve 104, only upon detecting an airspeed below a threshold, or only upon detecting an airspeed below a threshold and a loss of power in the engine. The velocity may be determined by means of Global Positioning System (GPS) data, by means of an airspeed sensor coupled to the control unit by both, or the like.

In still other embodiments, opening of the valve 156 may additionally or alternatively be performed by the pilot either directly or by providing an input to the control unit 182, which then actuates the valve 156. Coupling of yaw control inputs to the valve 104 or valve 136 may also be performed by means of a manual operation of a switch, valve, or some other actuator. A pilot may decide to engage the emergency operation rather than rely on automatic actuation.

Figure 9B:
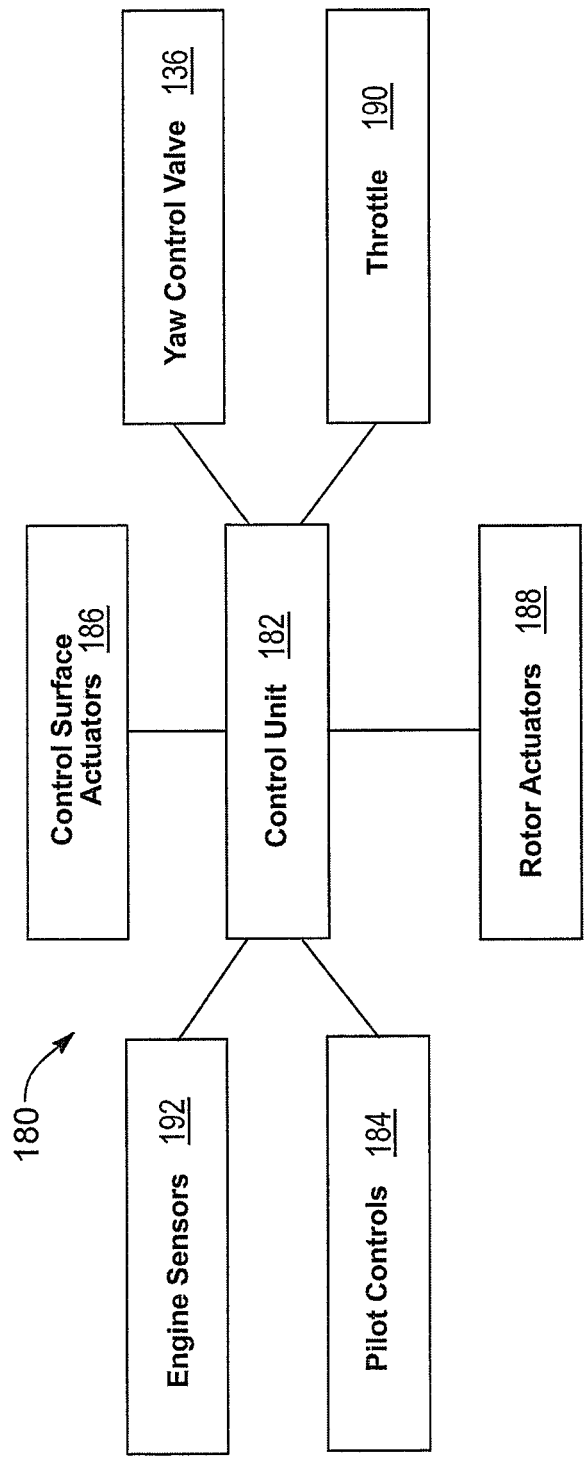

Referring to FIG. 9B, in some embodiments, the control unit 182 selectively switches yaw control signals from the rudder 22 or rudders 22a, 22b to the valve 136 or 104. The yaw control signals may be initiated by the pilot controls 184 or by an autopilot function of the control unit 182. The control unit 182 may be programmed to detect a condition, such as loss of air speed or power in the engine 48 and, in response, couple yaw control signals to the valve 136 or the valve 104.

In some embodiments, the control unit 182 may couple yaw control signals to the valve 136 or valve 104 only upon detecting an airspeed below a threshold, or only upon detecting both an airspeed below a threshold combined with a loss of power in the engine. The velocity may be determined by means of Global Positioning System (GPS) data or by means of an airspeed sensor coupled to the control unit. In some embodiments, the switching of yaw controls to the valve 136 or valve 104 may be performed manually by means of a switch included among the pilot controls 184. Thus sophisticated controls may be replaced by pilot judgment and manual controls.

Figure 10:
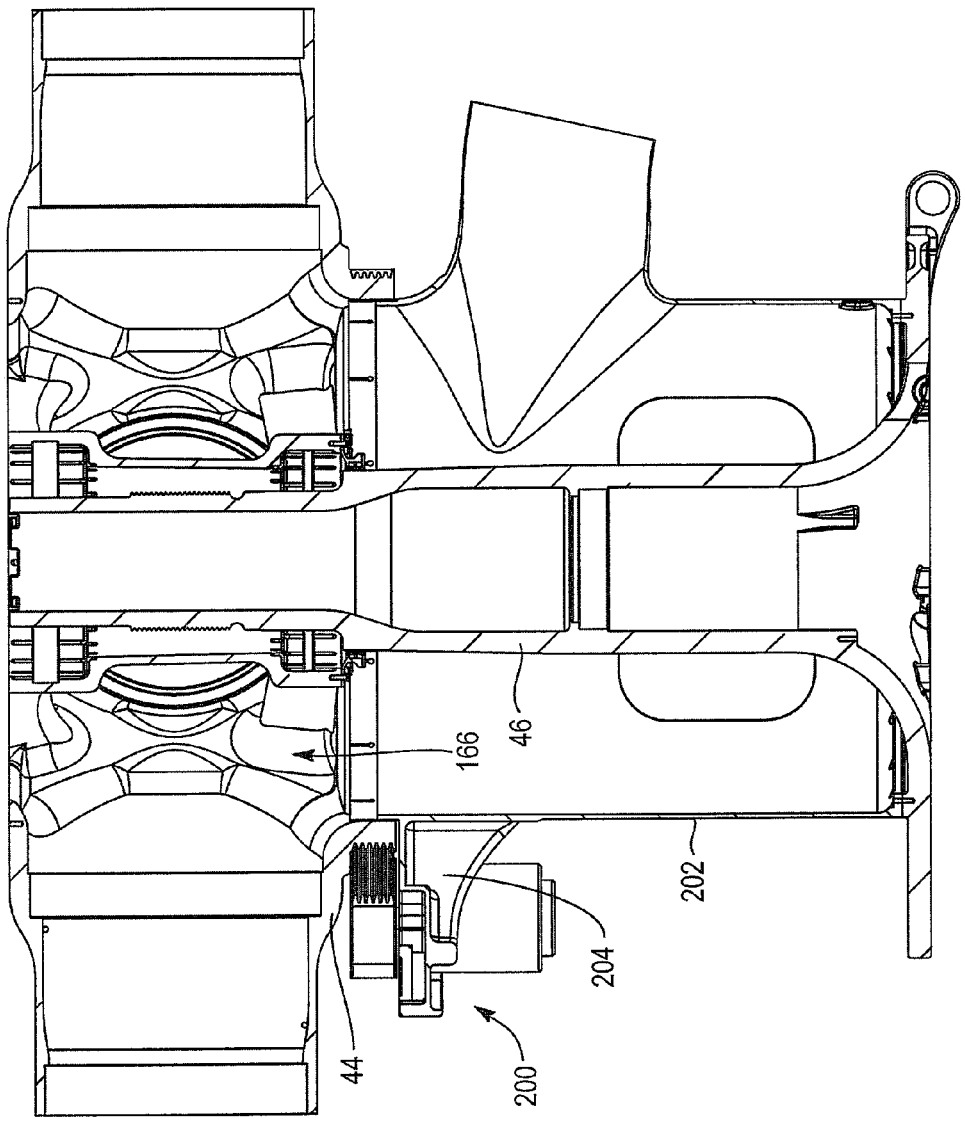
FIG. 10 is a side elevation view of a mast and hub incorporating an emergency power take-off system.

Referring to FIG. 10, in an autogyro, the rotor 40 is typically oriented such that the rotor 40 is compelled to rotate by lift and drag forces on the blades 42 in response to air flow over the rotor 40 due to forward movement of the aircraft. Therefore, in the event of a loss of power of the engine 48, the forward momentum of the aircraft 10 may cause the rotor 40 to continue to rotate. Accordingly, in some embodiments, an emergency power take-off 200 is coupled to the rotor 40 in order to provide one or more of hydraulic, pneumatic, and electrical power for the systems of the aircraft 10. The emergency power take-off 200 may provide one or both of hydraulic and pneumatic power to the valve 104 or valve 136 in order to provide yaw control in the event of a loss of power and at low speeds.

In the illustrated embodiment, a shroud 202 surrounds the mast 46 and is in fluid communication with the plenum 56. The space between the mast 46 and shroud 202 is in fluid communication with a cavity 206 defined by the hub 44 and in fluid communication with the blade ducts 60. The power take-off 200 is mounted to the shroud, such as by means of securement to a flange 208 mounted to the shroud 202. Other mounting configurations are also possible. For example, the power takeoff 200 may mount directly to the mast 46 or to a flange secured to the mast 46.

Figure 11:
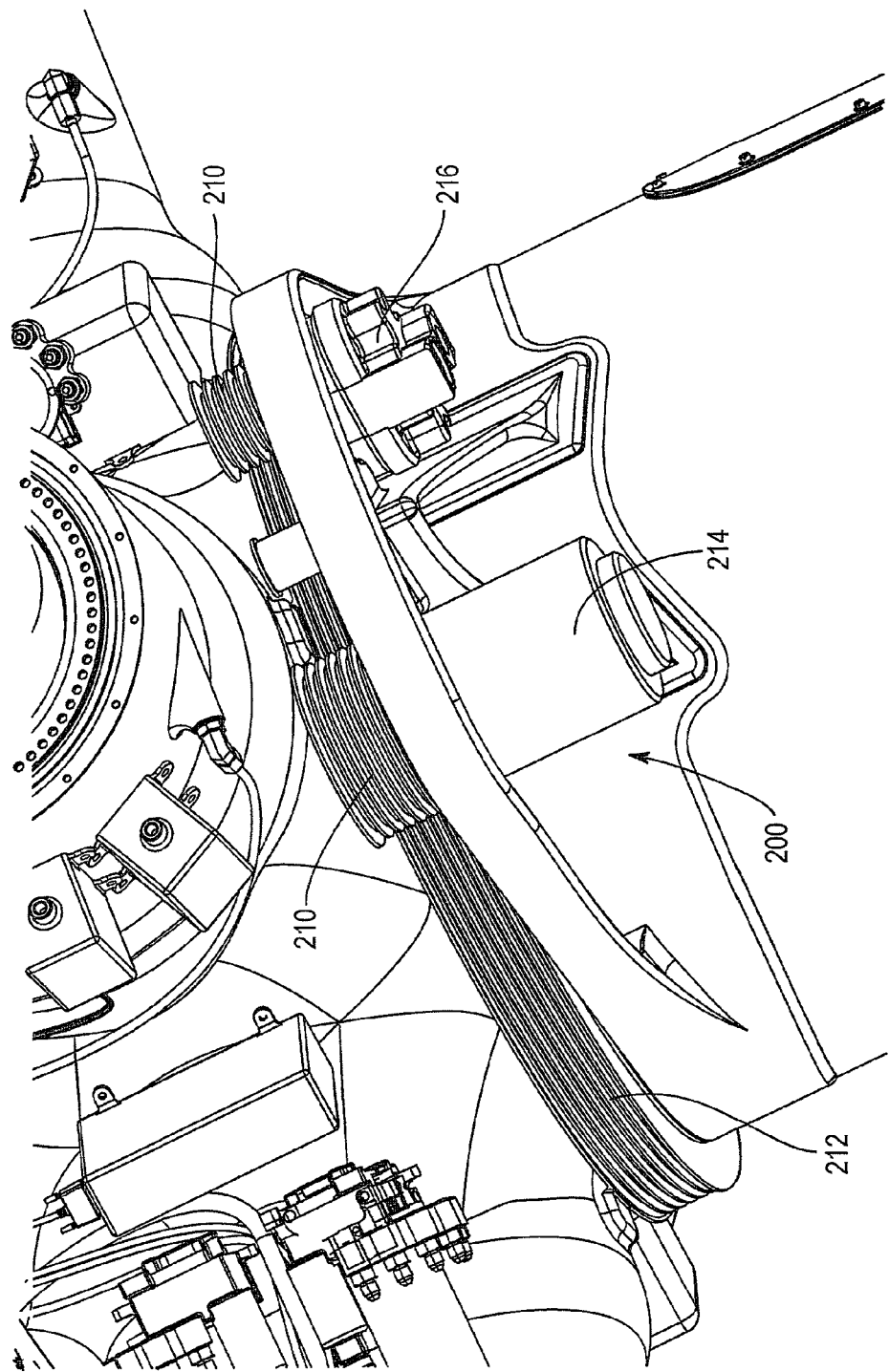
FIG. 11 is a partial isometric view of drive wheels and hub wheels of an emergency power take-off system.
Figure 12:
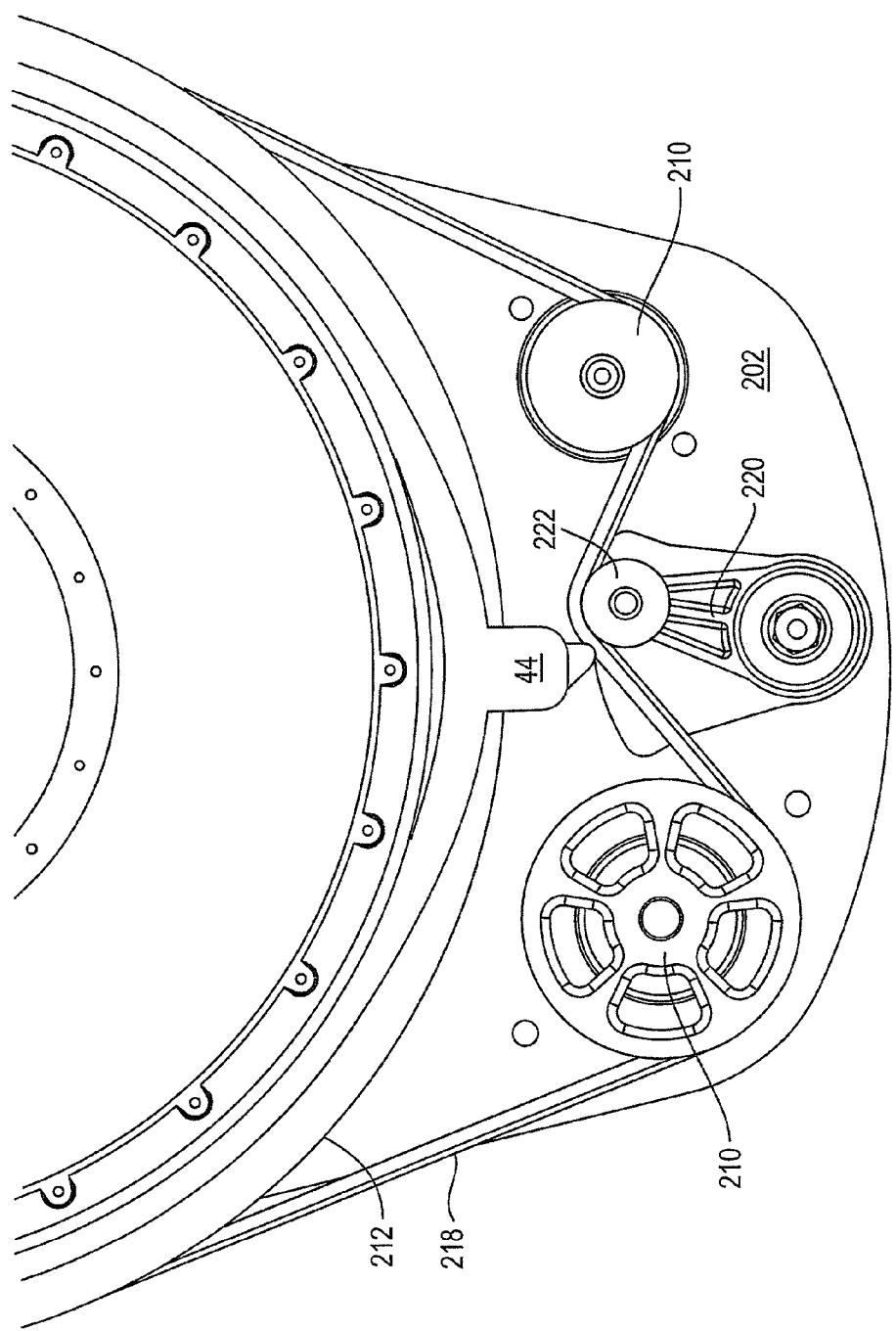
FIG. 12 is a top plan view of an emergency power take-off system.

Referring to FIGS. 11 and 12, the power take-off 200 may include one or more drives, such as drive wheels 210 that engage a hub wheel 212. The hub wheel 212 may be embodied as a portion of the hub 44 or a ring secured to the hub 44. The drive wheel 210 may engage the hub wheel 212 directly or by means of a belt. In the illustrated embodiment, the drive wheel and hub wheel 212 are grooved to reduce slippage of the belt with respect to the wheels 210, 212.

Where the drive wheel 210 engages the hub wheel 212 directly, the drive wheel 210 and hub wheel 212 may each include a geared surface or a resilient ring creating a high friction interface between the wheels 210, 212. In the illustrated embodiment, the drive wheel 210 engages an outer surface of the hub wheel 212. However, in some embodiments, the drive wheel 210 may engage an inner surface of the hub wheel 212 and be positioned within the hub wheel 212.

In the illustrated embodiment, the power take-off 200 includes two drive wheels 210, each coupled to one of a generator 214 and a hydraulic pump 216. In some embodiments, a pneumatic compressor may be used in the place of one or both of the generator 214 and the hydraulic pump 216. Alternatively, electrical or hydraulic power from the generator 214 or hydraulic pump 216 may drive a compressor 154 for providing air to a valve 104 or valve 136.

The generator 214 and hydraulic pump 216 may be mounted to the flange 208 opposite the drive wheels 210 such that drive shafts of the generator 214 and hydraulic pump 216 extend through the flange 208 to couple the generator 214 and hydraulic pump 216 to the drive wheels 210. Referring specifically to FIG. 12, a tension arm 220 may also be pivotally secured to the flange 208 and be biased, such as by means of a spring, to urge a roller 222 against a belt 218 encircling the drive wheels 210 and hub wheel 212.

Figure 13A:
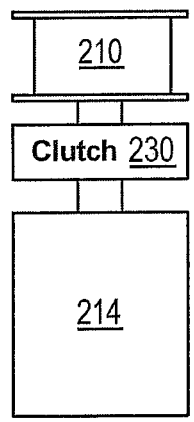
FIGS. 13A through 13C are schematic block diagrams of apparatus for activating an emergency take-off system.
Figure 13B:
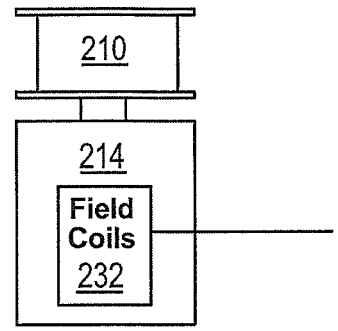
Figure 13C:
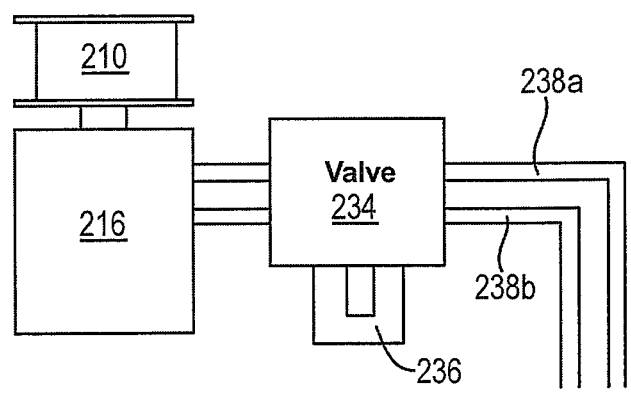

Referring to FIGS. 13A through 13C, various means may be used to activate and deactivate the power take-off 200. In order to avoid unnecessary loss of power during normal flying conditions, it may be advantageous to deactivate the power take-off 200. Referring specifically to FIG. 13A, in some embodiments a mechanically, electrically, or hydraulically actuated clutch 230 is interposed between a drive wheel 210 and the generator 214. A clutch 230 may be similarly interposed between a drive wheel 210 and the hydraulic pump 214 or a pneumatic compressor.

Referring to FIG. 13B, alternatively, the generator 214 may be activated and deactivated by controlling the amount of current applied to field coils 232 within the generator 214. As known in the art of generator design, electric current is generated by moving a coil through a magnetic field. The magnetic field may be generated by permanent magnets, electromagnets, or a combination of the two. Accordingly, the drag induced by the generator 214 may be reduced when not in use by turning off current to field coils 232 used as electromagnets for generating a magnetic field. During an emergency situation, current from the generator 214 may be routed to the field coils 232 in order to increase the current output from the generator 214.

Referring to FIG. 13C, similarly, when the hydraulic pump 216 is not in use, a valve 234 may prevent the flow of hydraulic fluid into the hydraulic pump 216 or route fluid through a recirculation path 236 in order to reduce drag induced by the hydraulic pump 216 when not in use. When in use, fluid may be routed in and out of the hydraulic pump 216 by means of input and output lines 238a, 238b, respectively.

Figure 14:
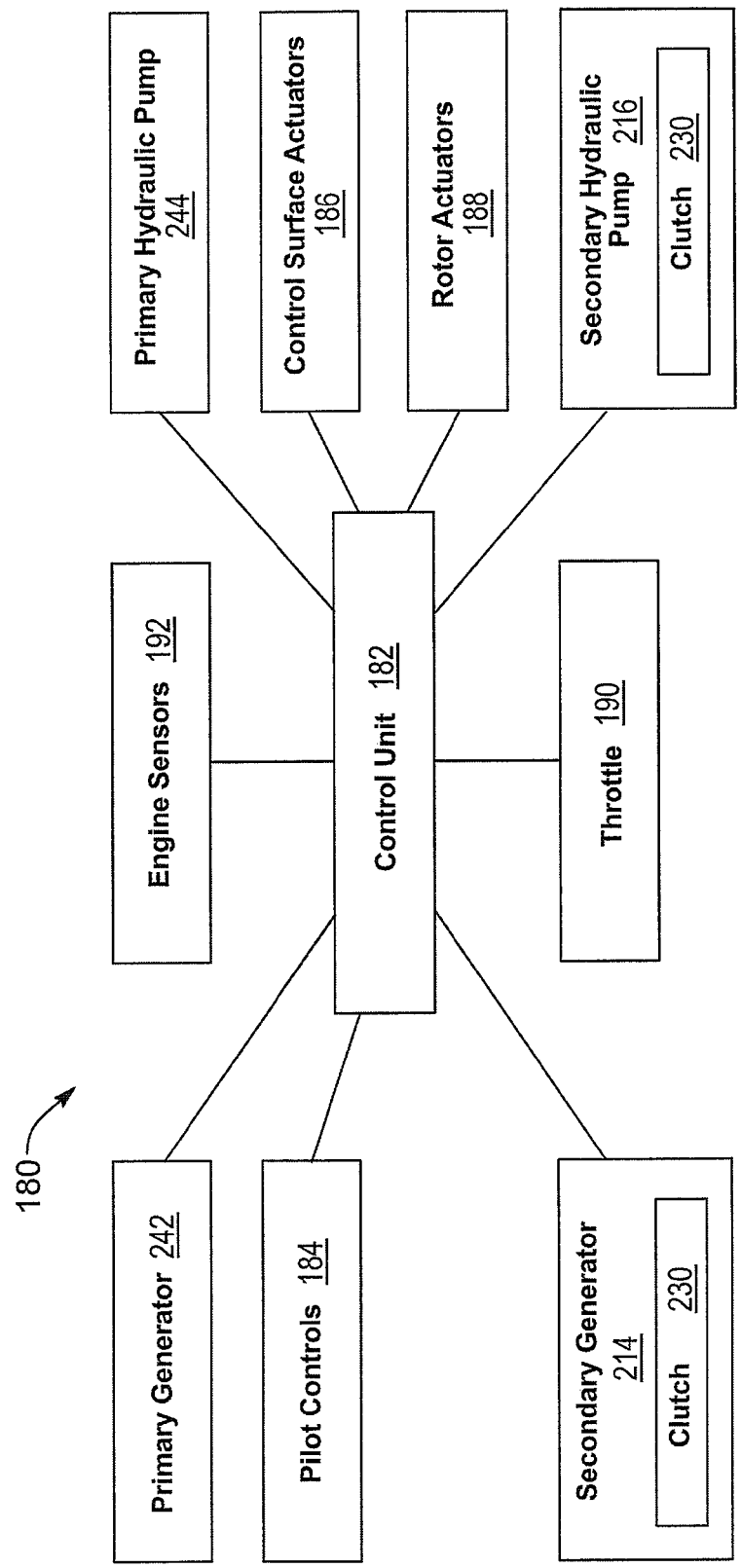
FIG. 14 is a schematic block diagram of a control system for an aircraft incorporating an emergency power take-off system.

Referring to FIG. 14, the control unit 182 may be configured to handle activation of the emergency power take-off 200 in the event of a loss of power due to engine failure or failure of one or both of a primary generator 242 or primary hydraulic pump 244. The control unit 182 may be programmed to activate a clutch 230 coupling a drive wheel 210 to the generator 214 or hydraulic pump 216 in response to detection of a loss of power from the engine 48 or a loss of voltage or pressure from a primary generator 242 or primary hydraulic pump 244, respectively.

Alternatively, the control unit 182 may be configured to supply power to field coils 232 or redirect fluid away from a recirculation path 236. This may occur in response to a detection of a loss of power from the engine 48 or a loss of voltage or pressure from a primary generator 242 or primary hydraulic pump 244, respectively.

The control unit 182 may be further programmed to activate switches and valves necessary to route current or pressurized hydraulic fluid to the systems of the aircraft 10, such as the control surface actuators 186 and rotor actuators 188, from the generator 214 or hydraulic pump 216 as needed. This may include routing hydraulic fluid to a motor 130 powering the fan 110 or to a pneumatic pump for driving the fan 110 or jets 100a, 100b in the embodiments of FIGS. 3 through 5. The control unit 182 may further be programmed to sequester the primary generator 242 or primary hydraulic pump 244 to avoid leakage of current or fluid or to reduce power loss. Some or all of the operations described above as being performed by the control unit 182 with respect to the power take-off 200 may also be performed by a pilot manually operating switches, valves, or other mechanical actuators.

Figure 15:
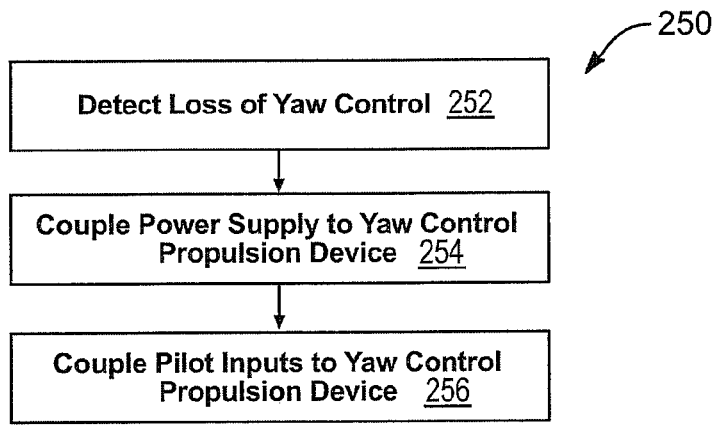
FIG. 15 is process flow diagram of a method for operating an aircraft incorporating an emergency yaw control propulsion device.

Referring to FIG. 15, the foregoing apparatus may be used to perform the illustrated method 250 to achieve yaw control in the event of one or both of loss of engine power and low speed flight. The method 250 may be performed partially or completely by means of one or both of a control unit 182 or pilot inputs. The method 250 includes detecting 252 loss of yaw control. This may include detecting 252 the occurrence of one or all of, either separately or simultaneously, loss of power from the engine 48, loss of control of a rudder 22, and an air speed below a threshold air speed.

In the event of detection 252 of a loss of yaw control, a power supply is coupled 254 to a yaw propulsion device. The yaw propulsion device may include jets 100a, 100b, a reversible tail fan 110, or the like. The power supply may be an emergency power supply such as one of those described above with respect to FIGS. 8A through 8C. In such embodiments, coupling 254 the power supply to the yaw propulsion device may include opening the valve 156 as described hereinabove.

The power supply may also be an emergency power take-off 200 as described above with respect to FIGS. 10 through 14. In such embodiments, coupling 254 the power supply to the yaw propulsion device may include activating one or both of a secondary generator 214 or secondary hydraulic pump 216 as described hereinabove. In some embodiments, the power supply may be a pneumatic compressor coupled to the rotor 40 in the same manner as the hydraulic pump 216. Accordingly, coupling 254 the power supply to the yaw propulsion device may include coupling the compressor to one of the valve 104 and the valve 136.

In the event that a loss of yaw control is due to low air speed, the power supply systems coupled 254 to the yaw propulsion device may be the aircraft's primary power systems, such as a primary hydraulic pump 244, electric generator 242, or a pneumatic compressor, powered by power from the engine 48. Pilot inputs, or autopilot control signals, may then be coupled 256 to the yaw propulsion device, such as by coupling the yaw control signals to a valve 104 or valve 136. The pilot inputs may continue to be coupled to the rudder 22 as well or may be completely redirected to the yaw propulsion device.

Figure 16:
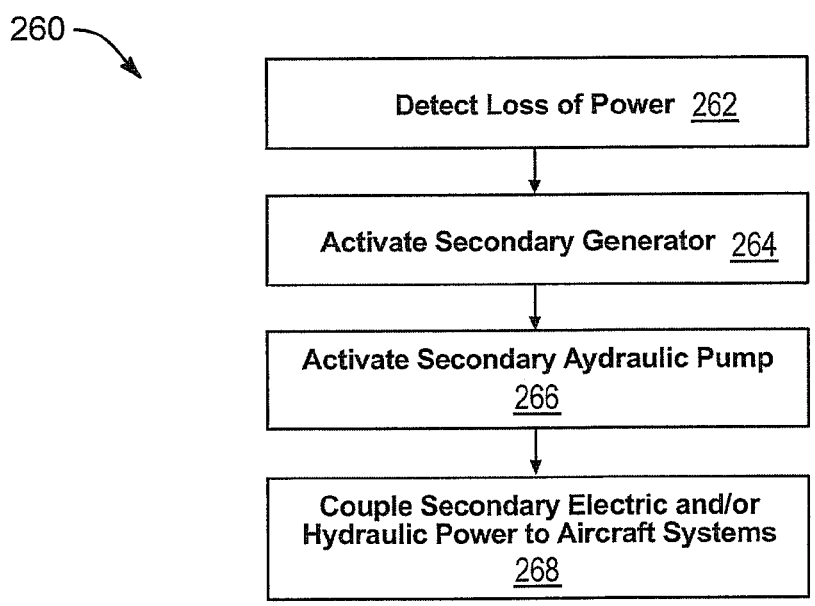
FIG. 16 is a process flow diagram of a method for operating an aircraft incorporating an emergency power take-off system.

Referring to FIG. 16, the illustrated method 260 may be executed in response to a loss of power due to failure of an engine 48 or failure of a primary generator 244 or hydraulic pump 244. The method 260 may be executed wholly or completely by one or both of the control unit 182 and pilot inputs. The method 260 includes detecting 262 a loss of power of an engine 48, primary generator 242, or primary hydraulic pump 244.

If engine failure or primary generator failure is detected 262, then the secondary generator 214 is activated 264, such as by engaging a clutch 230 or supplying current to field coils 232. If engine failure or primary hydraulic pump failure is detected, then the secondary hydraulic pump 216 is activated 266, such as by engaging a clutch 230 or routing hydraulic fluid away from a recirculation path 236 and through input and output lines 238a, 238b.

Power from one or both of the secondary generator 214 and secondary hydraulic pump 216 may then be routed through the systems of the aircraft 10, including the yaw propulsion systems described in FIGS. 5A through 9B. Other systems may include devices or actuators, such as the control surface actuators 186, rotor actuators 188, landing gear actuators, electric servos, batteries, instruments, and the like.

Figure 17:
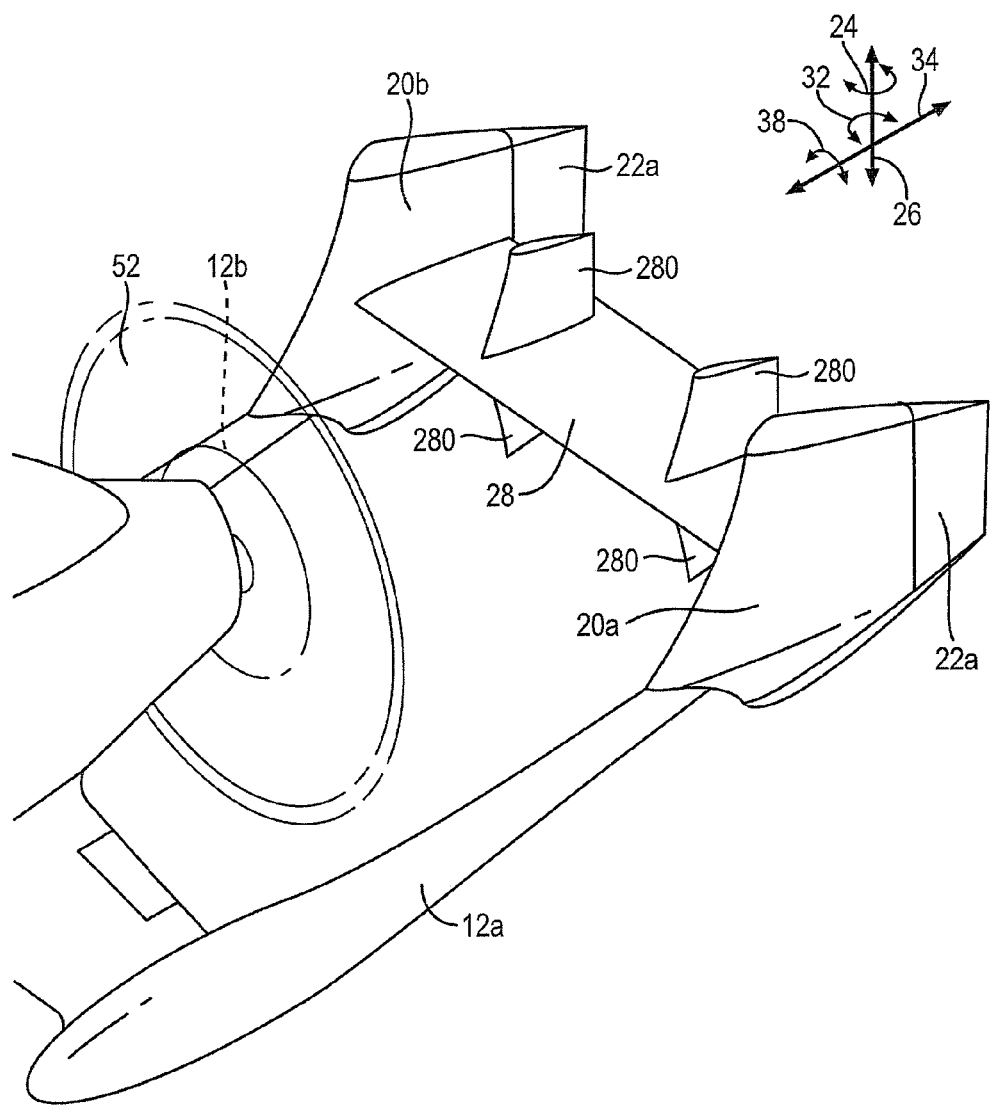
FIG. 17 is a partial isometric view of an aircraft incorporating both main and auxiliary rudders.

Referring to FIG. 17, in some embodiments, an aircraft 10, such as the aircraft 10 of FIG. 4, may include auxiliary rudders 280 mounted to the horizontal stabilizer 28 and positioned between the rudders 22. In the illustrated embodiment, rudders 280 are mounted to opposing surfaces of the horizontal stabilizer 28 (e.g., horizontal airfoil 28 stabilizing vertically as an elevator and stabilizer do in a fixed wing aircraft). They project upward and downward from the horizontal stabilizer 28 in the vertical direction 26.

Figure 18:
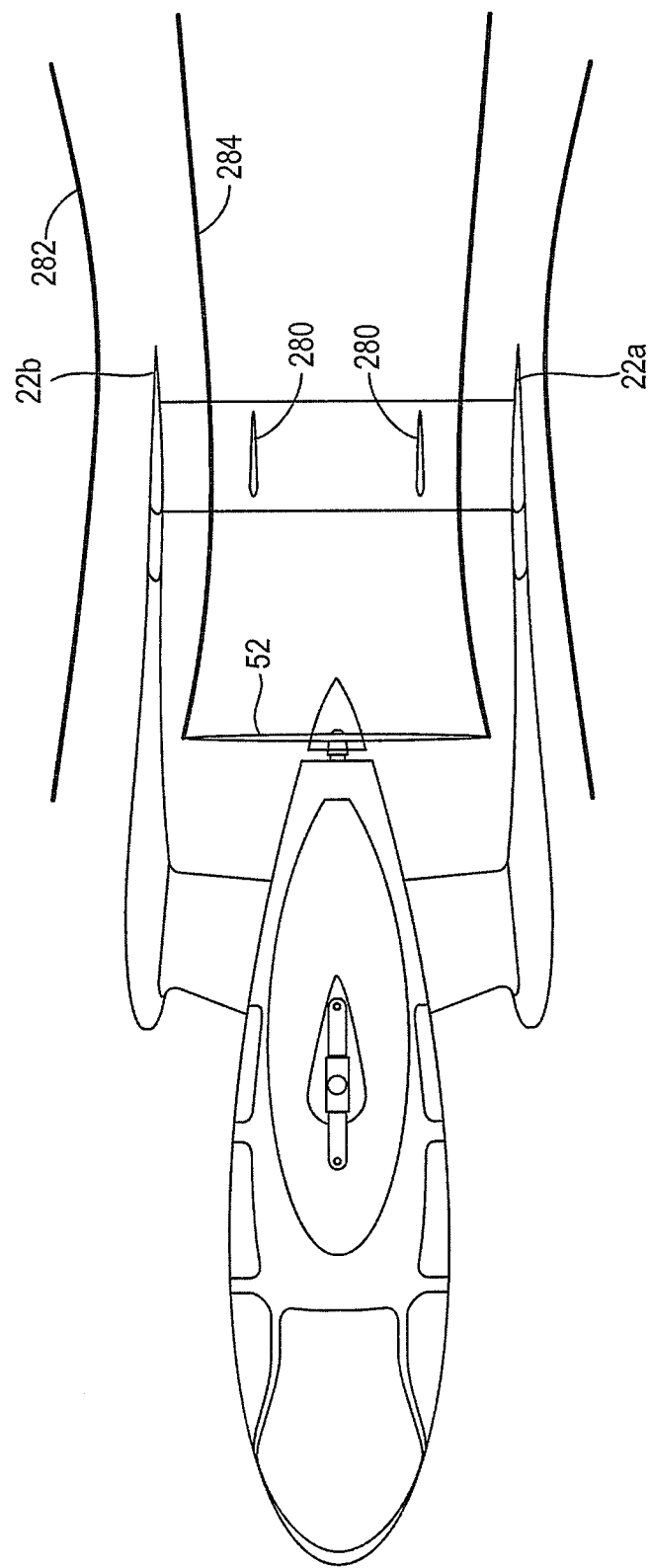
FIG. 18 is a top plan view illustrating air flow over an aircraft incorporating main and auxiliary rudders.

Referring to FIG. 18, in flight, the rudders 22 are exposed to air flow 282 which is in the "free stream" or substantially undisturbed ambient air through which the aircraft 10 passes. Therefore, the flow 282 has a velocity relative to the aircraft 10. Actuation of the rudders 22 causes the rudders 22 to redirect a portion of this air flow 282, resulting in momentum change and a force, causing a yaw moment on the aircraft 10. At low speeds, especially in the event of an "engine off" landing, the air flow 282 may be too slow to provide an adequate yaw moment, particularly in the presence of cross winds.

The auxiliary rudders 280 advantageously are located within a prop stream tube 284, which includes air flow impelled by the prop 284, a jet, or some other propulsion source. Inasmuch as the velocity of air within the prop stream tube 284 is independent of the airspeed of the aircraft 10, the velocity of airflow over the auxiliary rudders 280 may be larger than the velocity of air incident on the rudders 22. The auxiliary rudders 280 therefore may be able to generate a yaw moment greater than that generated by the rudders 22 at a given air speed.

Figure 19A:
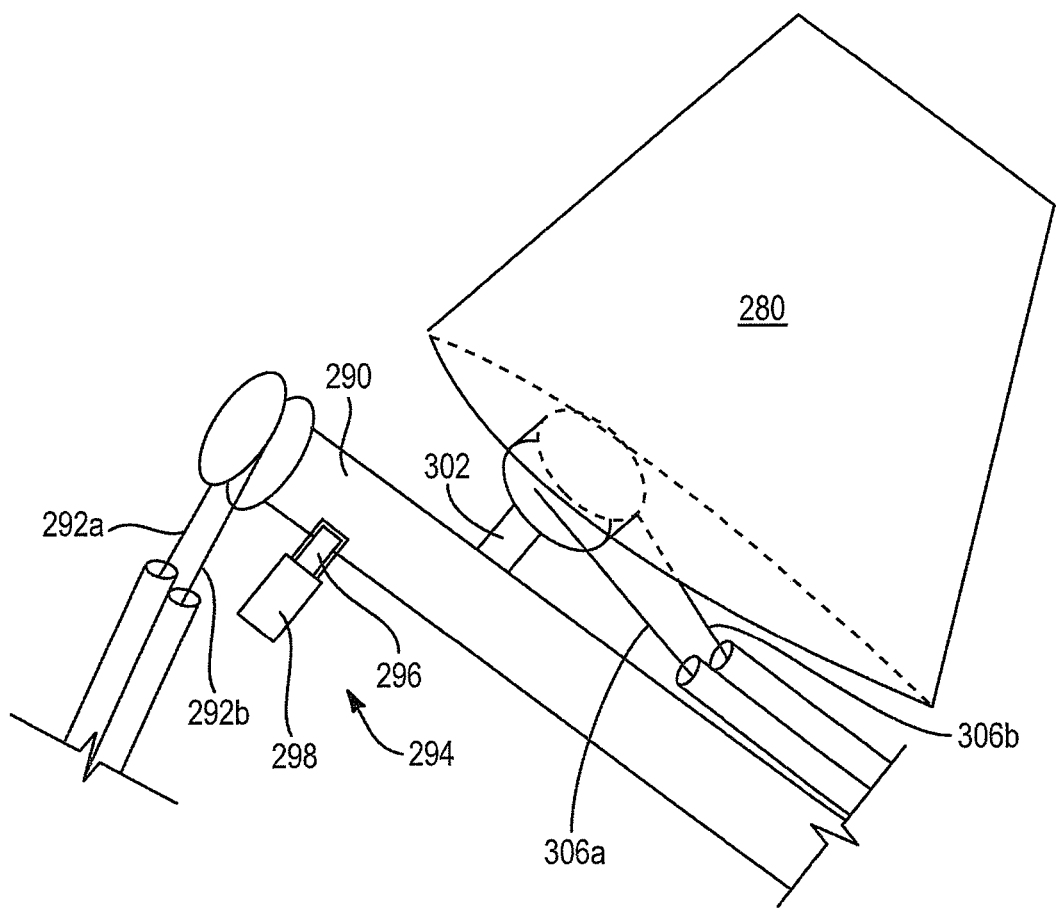
FIGS. 19A and 19B are isometric views of an auxiliary rudder in deployed and stowed positions, respectively.
Figure 19B:
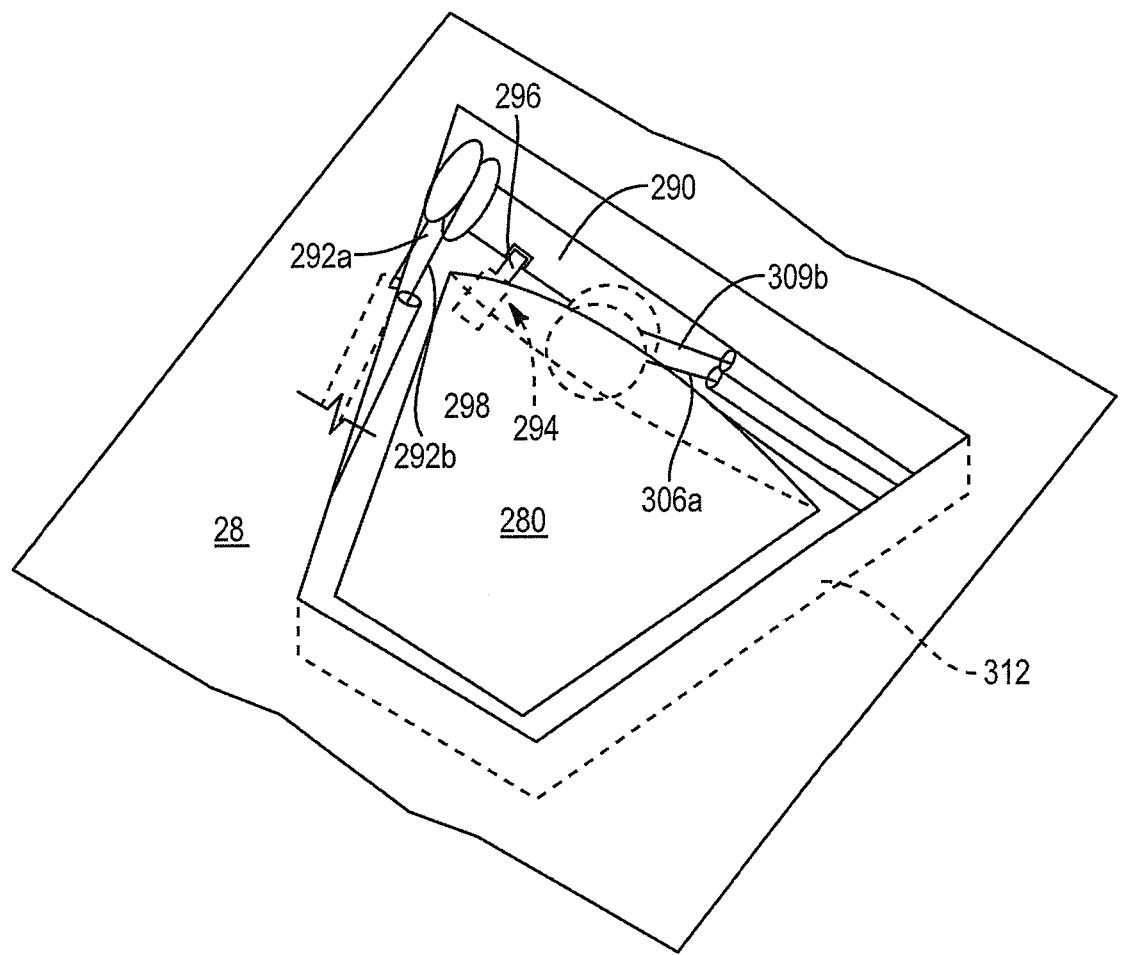

Referring to FIGS. 19A and 19B, while still referring to FIG. 17, inasmuch as the auxiliary rudders 280 are not needed during high speed flight, the rudders 280 may advantageously fold to a lower profile configuration during high speed flight, as shown by the dotted representation of the rudders 280 in FIG. 17. Various methods of hinging and actuation may be used to fold the rudders 280 during high speed flight as known in the art of mechanical design.

Hydraulic, electrical, and mechanical actuators as known in the art of aircraft design for actuating control surfaces may be used. For example, a deployment shaft 290 may be rotatably mounted within the vertical stabilizer 28 and be actuated by means of an actuator such as by means of hydraulic drives or one or more deployment cables 292a, 292b that are tensioned and relaxed to alter the orientation of an auxiliary rudder 280.

A lock 294 may retain the rudder 280 in the deployed position. Any suitable locking mechanism known in the mechanical art may be used. For example, an actuated piston 296 within a cylinder 298 may be driven by means of electrical, hydraulic, or pneumatic power into a receptacle 300 formed in the deployment shaft 290 in order to retain the rudder 280 in the deployed position. The rudder 280 may be rotatably mounted to the deployment shaft 290 such that following deployment the rudder 280 may be rotated in order to induce a yaw moment on the aircraft 10.

In the illustrated embodiment, the rudder 280 rotatably mounts to a shaft 302 extending perpendicular to the deployment shaft 290. The rudder 280 may rotatably mount to the shaft 302 or the shaft 302 may rotatably mount to the deployment shaft 290. An actuator, such as cables 306a, 306b may engage the shaft 302 or rudder 280 and may be actuated in order to change the angle of the rudder 280 within the prop stream tube 288.

Referring specifically to FIG. 19B, the deployment shaft 290 may be actuated, such as by means of the cables 292a, 292b, or some other actuator, in order to move the rudder 280 into the illustrated stowed position in which the rudder 280 is oriented substantially parallel, e.g. within about 10 degrees, to the horizontal stabilizer 28.

For example, the axis of rotation of the rudder 280 about the shaft 302 may be more parallel to the horizontal stabilizer 28 than when the rudder 280 is in the deployed position. The angular separation between the deployed and stowed positions may be between about 70 and 100 degrees.

The horizontal stabilizer 28 may define a receptacle 308 or recess 308 for receiving all or part of the rudder 280. Thus, an exposed surface 310 of the rudder 280 projects less prominently from the horizontal stabilizer 28. The lock 294, or some other lock, may also retain the rudder 280 in the stowed position. For example, the piston 296 may be urged into a stowage receptacle 312 formed in the deployment shaft 250 in order to retain the rudder 280 in the stowed position.

Figure 20:
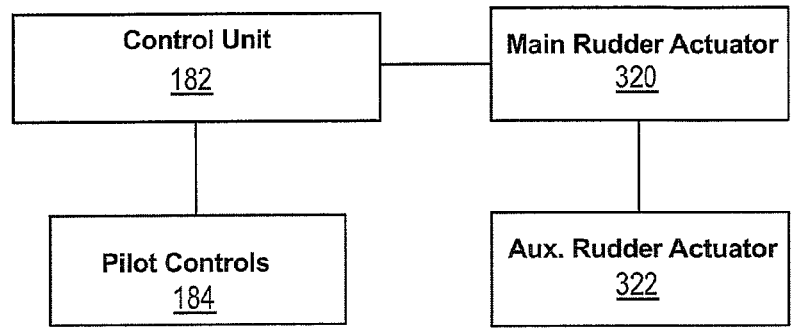
FIG. 20 is a schematic block diagram of a control system for an aircraft incorporating both main and auxiliary rudders.

Referring to FIG. 20, in some embodiments, the control unit 182 is coupled to a main rudder actuator 320 operable to change the orientation of the rudders 22a, 22b. The control unit may also be coupled to an auxiliary rudder actuator 322. In some embodiments, the auxiliary rudders 280 are actuated synchronously with the rudders 22a, 22b at all times. In such embodiments, the rudders 22a, 22b and auxiliary rudders 280 may be actuated by common actuators and linked to one another such that they are compelled to move in unison.

Figure 21:
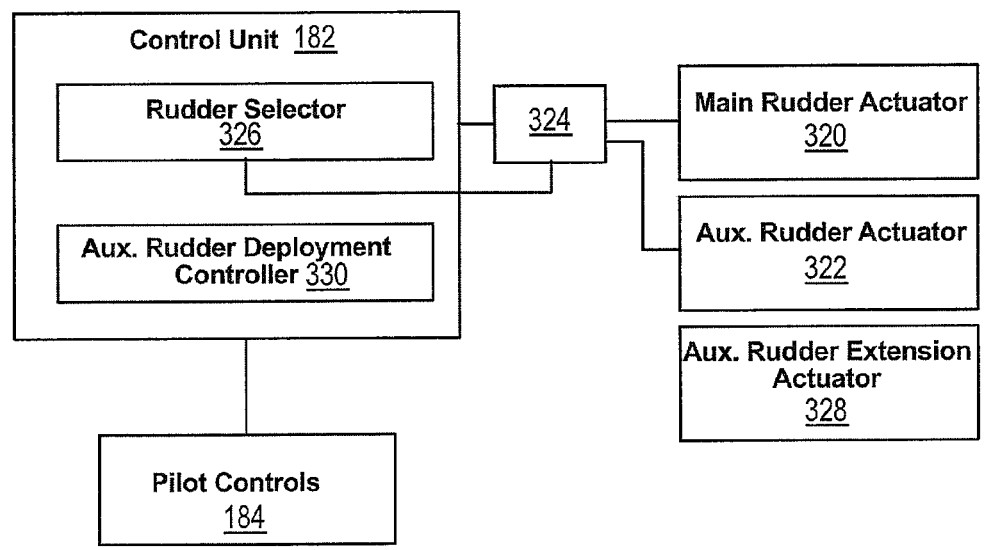
FIG. 21 is a schematic block diagram of an alternative embodiment of a control system for an aircraft incorporating both main and auxiliary rudders.

Referring to FIG. 21, in an alternative embodiment, a switch 324 controls which of the rudders 22a, 22b and the auxiliary rudders 280 receives yaw control inputs. The switch 324 may couple control signals to one or both of the main rudder actuator 320 and auxiliary rudder actuator 322 depending on the state of the switch 324. Alternatively, the switch 324 may change the coupling of mechanical, pneumatic, or hydraulic force from a single actuator to one or both of the rudders 22a, 22b and the rudders 280 according to the state of the switch 324.

The control unit 182 may include a rudder selector 326 programmed to operate the switch 324. The rudder selector 326 may be programmed to couple yaw control inputs from one or both of the pilot controls 184 and an autopilot computer to the auxiliary rudders 280 when the airspeed of the aircraft 10 is below a threshold and to couple yaw control inputs to the rudders 22a, 22b when the airspeed of the aircraft 10 is above the threshold.

In one embodiment a transition region is defined such that both the rudders 22a, 22b and rudders 280 are actuated simultaneously for airspeeds within the transition region. The rudders 280 are actuated exclusively below the transition region. The rudders 22a, 22b are actuated exclusively above the transition region. In some embodiments, the pilot inputs 184 may additionally or alternatively include manually operable interface to control the switch 324 and select one or both of the rudders 22a, 22b and rudders 280 to receive yaw control inputs.

In some embodiments, an auxiliary rudder extender 328 may actuate the rudders 280 to transition the rudders 280 between the stowed and deployed orientations described hereinabove. In such embodiments, the control unit 182 may include an auxiliary rudder deployment controller 330.

The deployment controller 330 may be programmed to move the auxiliary rudders 280 to the deployed orientation when the controller 182 determines that yaw control inputs are to be coupled to the auxiliary rudders 280 as described hereinabove. The deployment controller 330 may also be programmed to move the auxiliary rudders 280 to the stowed orientation when the controller 182 determines the yaw control inputs are to coupled to the rudders 22a, 22b as described hereinabove. The pilot inputs 184 may also include an interface to control the auxiliary rudder extender 328 in addition or as an alternative to the auxiliary rudder deployment controller 330 of the control unit 182.

Figure 22:
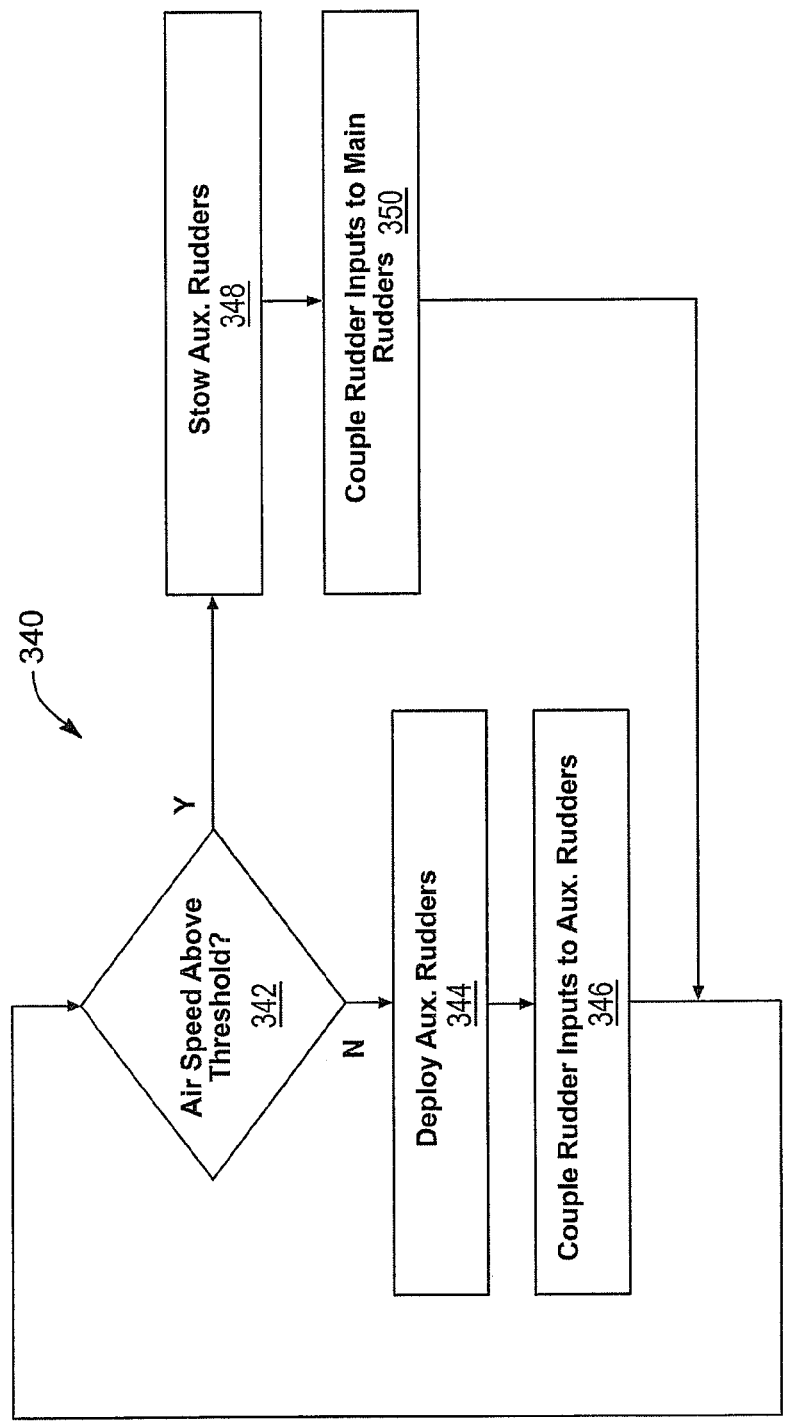
FIG. 22 is a process flow diagram of a method for operating an aircraft incorporating both main and auxiliary rudders.

Referring to FIG. 22, a pilot, control unit 182, or a combination of the two, may execute a method 340 for operating an aircraft 10 including both main rudders 22a, 22b and one or more auxiliary rudders 280. The method 340 may include evaluating 342 the airspeed of the aircraft 10 with respect to a threshold. If the air speed is below the threshold, then the auxiliary rudders 280 are deployed 344, such as by moving the rudders 280 to the deployed position.

In embodiments where the rudders 280 are not movable between stowed and deployed positions, deployment 344 may be omitted. Yaw control inputs from a pilot, or an autopilot computer, may then be coupled to the auxiliary rudders 280 either synchronously with the main rudders 22a, 22b, exclusive of the main rudders 22a, 22b, or in some other control scheme optimizing used each.

If the airspeed is above the threshold, then the rudders 280 may be stowed 348. This is useful in embodiments having rudders 280 movable between deployed and stowed positions. Yaw control inputs from a pilot or autopilot computer may then be coupled 350 to the main rudders 22a, 22b and decoupled from the auxiliary rudders 280.

Figure 23:
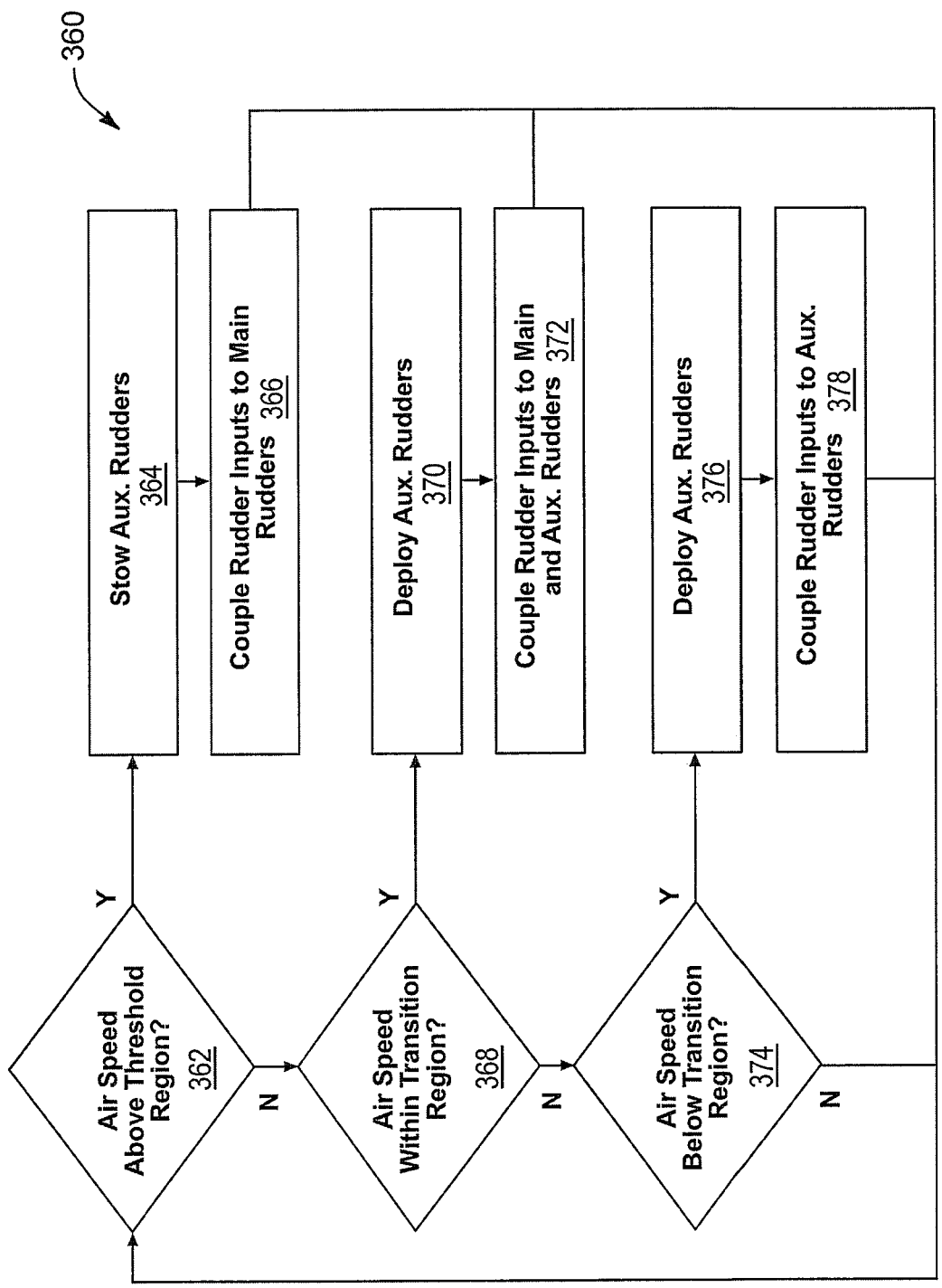
FIG. 23 is a process flow diagram of an alternative method for operating an aircraft incorporating both main and auxiliary rudders.

Referring to FIG. 23, in an alternative embodiment, a pilot, control unit 142, or a combination of the two, may execute a method 360 for operating an aircraft 10 including both main rudders 22a, 22b and one or more auxiliary rudders 280. The method 360 includes evaluating 362 whether the airspeed of the aircraft 10 is above a transition region. If so, then the auxiliary rudders 280 are stowed 364 if they are found in a deployed position and are movable between deployed and stowed positions. Rudder control inputs are then coupled 366 exclusively to the main rudders 22a, 22b.

The method 360 may further include evaluating 368 whether the airspeed of the aircraft 10 is within the transition region. If so, then the auxiliary rudders 280 are deployed 370 if they are found in the stowed position and if the rudders 280 are movable between stowed and deployed positions. Rudder control inputs are then coupled 372 to both the auxiliary rudders 280 and main rudders 22a, 22b.

The method 320 may further include evaluating 374 whether the airspeed of the aircraft 10 is below the transition region. If so, then the auxiliary rudders 280 are deployed 376 if they are not already in the deployed position and if they are movable between stowed and deployed positions. Rudder control inputs are then coupled 378 to the auxiliary rudders either exclusive of or synchronously with the main rudders 22a, 22b.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A rotorcraft comprising:
an airframe;
a rotor rotatably mounted to the airframe and rotatable about an axis of rotation;
a vertical stabilizer mounted to the airframe offset from the axis of rotation;
an emergency power supply mounted to the airframe;
a fan mounted to the vertical stabilizer; and
a controller selectively coupling the emergency power supply to the fan effective to drive the fan in forward and reverse directions;
wherein the emergency power supply includes an air reservoir containing compressed air;
wherein the air reservoir is in fluid communication with a hydraulic reservoir containing hydraulic fluid;
wherein the fan is coupled to a hydraulic motor; and
wherein the hydraulic reservoir is in selective fluid communication with the hydraulic motor.

2. The rotorcraft of claim 1, wherein the air reservoir comprises a bladder positioned within the hydraulic reservoir.

3. The rotorcraft of claim 1, further comprising a pneumatic motor coupled to the fan;
wherein the air reservoir is in selective fluid communication with the pneumatic motor.

4. The rotorcraft of claim 1, wherein the vertical stabilizer includes an aperture; and
wherein the fan is mounted within the aperture.

5. The rotorcraft of claim 4, further comprising an outer channel embedded within the vertical stabilizer;
wherein the fan includes an inner portion, an outer portion, and a ring positioned between the inner and outer portions, the outer portion positioned within the outer channel having the ring positioned to hinder air flow out of the channel; and
wherein the emergency power supply is a compressed air supply in selective fluid communication with the channel.

6. The rotorcraft of claim 1, wherein the emergency power supply comprises at least one of a hydraulic pump and an alternator rotatably coupled to the rotor.

7. The rotorcraft of claim 6, further comprising a belt coupling the rotor to the at least one of the hydraulic pump and alternator.

8. The rotorcraft of claim 7, wherein the rotor comprises:
a mast mounted to the rotorcraft;
a hub mounted to the mast; and
a plurality of blades coupled to the hub; and
wherein the belt encircles one or both of the mast and hub.

9. A method for controlling a rotorcraft during an emergency loss of power, the method comprising:
urging the rotorcraft translationally under power of an engine, the rotorcraft further comprising:
an airframe,
a rotor rotatably mounted to the airframe and rotatable about an axis of rotation,
a vertical stabilizer mounted to the airframe offset from the axis of rotation,
an emergency power supply mounted to the airframe, and
a fan mounted to the vertical stabilizer;
maintaining the fan unpowered while urging the rotorcraft translationally under power of the engine;
detecting loss of power of the engine; and
in response to detection of loss of power, coupling the emergency power supply to the fan in proportion to yaw control inputs;
wherein the emergency power supply includes an air reservoir containing compressed air.

10. The method of claim 9, wherein:
the air reservoir is in fluid communication with a hydraulic reservoir containing hydraulic fluid;
the fan is coupled to a hydraulic motor; and
coupling the emergency power supply to the fan comprises placing the hydraulic reservoir in fluid communication with the hydraulic motor.

11. The method of claim 10, wherein the air reservoir comprises a bladder positioned within the hydraulic reservoir.

12. The method of claim 9, wherein:
the aircraft further comprises a pneumatic motor coupled to the fan; and
coupling the emergency power supply to the fan comprises placing the air reservoir in selective fluid communication with the pneumatic motor.

13. The method of claim 9, wherein:
the vertical stabilizer includes an aperture; and
the fan is mounted within the aperture.

14. The method of claim 13, wherein:
an outer channel is embedded within the vertical stabilizer;
the fan includes an inner portion, an outer portion, and a ring positioned between the inner and outer portions, the outer portion positioned within the outer channel having the ring positioned to hinder air flow out of the channel; and
coupling the emergency power supply to the fan comprises releasing air from the air reservoir into the outer channel in proportion to yaw control inputs.

15. The method of claim 9, wherein coupling the emergency power supply to the fan comprises coupling power to the fan in proportion to yaw control inputs from one of a hydraulic pump and an alternator rotatably coupled to the rotor.

16. The method of claim 15, wherein the rotor comprises:
a mast mounted to the rotorcraft;
a hub mounted to the mast; and
a plurality of blades coupled to the hub; and
wherein the belt encircles one or both of the mast and hub.

17. A rotorcraft comprising:
an airframe;
a rotor rotatably mounted to the airframe and rotatable about an axis of rotation;
a vertical stabilizer mounted to the airframe offset from the axis of rotation;
an emergency power supply mounted to the airframe;
an engine adapted to propel the rotorcraft translationally;
a fan mounted to the vertical stabilizer; and
a controller programmed to
  propel the rotorcraft translationally under power of the engine responsive to pilot inputs,
  maintain the fan unpowered while urging the rotorcraft translationally under power of the engine,
  detect a loss of power of the engine, and
  in response to detection of loss of power, couple the emergency power supply to the fan in proportion to pilot inputs; and
the emergency power supply further comprising at least one of :
  an air reservoir containing compressed air in selective fluid communication with a pneumatic motor coupled to the fan, and
  an air reservoir containing compressed air and positioned within a hydraulic reservoir, the hydraulic reservoir being in selective fluid communication with a hydraulic motor coupled to the fan.

\* \* \* \* \*